United States Patent
Augustine et al.

(10) Patent No.: US 10,783,587 B1
(45) Date of Patent: Sep. 22, 2020

(54) DETERMINING A DRIVER SCORE BASED ON THE DRIVER'S RESPONSE TO AUTONOMOUS FEATURES OF A VEHICLE

(71) Applicant: Allstate Insurance Company, Northbrook, IL (US)

(72) Inventors: Suresh Augustine, Chicago, IL (US); Edward A. Biemer, Glencoe, IL (US); Dagmar Dugan, Hawthorn Woods, IL (US); Jennifer Field, Northbrook, IL (US); Laura Flodin, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 457 days.

(21) Appl. No.: 14/458,826

(22) Filed: Aug. 13, 2014

Related U.S. Application Data

(63) Continuation-in-part of application No. 14/184,272, filed on Feb. 19, 2014, now Pat. No. 9,940,676.

(51) Int. Cl.
  *G06Q 40/08* (2012.01)
  *G07C 5/00* (2006.01)
(52) U.S. Cl.
  CPC .............. *G06Q 40/08* (2013.01); *G07C 5/00* (2013.01)
(58) Field of Classification Search
  CPC .................................. G06Q 40/08; G07C 5/00
  See application file for complete search history.

(56) References Cited

U.S. PATENT DOCUMENTS

| | | | |
|---|---|---|---|
| 83,960 | A | 11/1868 | Heator |
| 4,119,166 | A | 10/1978 | Ayotte et al. |
| 4,622,636 | A | 11/1986 | Tachibana |

(Continued)

FOREIGN PATENT DOCUMENTS

| | | |
|---|---|---|
| CN | 101131588 A | 2/2008 |
| DE | 102010001006 A1 | 7/2011 |

(Continued)

OTHER PUBLICATIONS

Zhu et al., U.S. Appl. No. 61/391,271, filed Oct. 8, 2010; Specification, "Google 3.8-292," "Autonomous Vehicles"; 56 pages (Year: 2010).*

(Continued)

*Primary Examiner* — Mike Anderson
*Assistant Examiner* — Bolko M Hamerski
(74) *Attorney, Agent, or Firm* — Banner & Witcoff, Ltd.

(57) ABSTRACT

Systems and methods are disclosed for generating vehicle insurance rates based on driver-independent variables and/or driver-dependent variables. Vehicle insurance rates may additionally or alternatively be based on changes in the level of autonomy of vehicles. In some embodiments, a density of vehicles near a target vehicle may be tracked. Vehicle insurance rates may be determined based on the vehicle density. Furthermore, systems and methods are disclosed for analyzing a driver's use of autonomous vehicle features and/or the driver's maintenance of the autonomous vehicle. The driver may also be taught certain driving skills by enabling vehicle teaching features. The driver's response to these teaching features may be monitored, and a reward or recommendation may be generated and provided to the driver based on the driver's response.

20 Claims, 10 Drawing Sheets

(56) References Cited

U.S. PATENT DOCUMENTS

| | | | |
|---|---|---|---|
| 4,706,072 A | 11/1987 | Ikeyama | |
| 4,926,336 A | 5/1990 | Yamada | |
| 5,053,964 A | 10/1991 | Mister et al. | |
| 5,270,708 A | 12/1993 | Kamishima | |
| 5,295,551 A | 3/1994 | Sukonick | |
| 5,430,432 A | 7/1995 | Camhi et al. | |
| 5,465,079 A | 11/1995 | Bouchard et al. | |
| 5,475,387 A | 12/1995 | Matsumoto | |
| 5,572,449 A | 11/1996 | Tang et al. | |
| 5,680,122 A | 10/1997 | Mio | |
| 5,710,565 A | 1/1998 | Shirai et al. | |
| 5,797,134 A | 8/1998 | McMillan et al. | |
| 5,848,373 A | 12/1998 | DeLorme et al. | |
| 6,026,345 A | 2/2000 | Shah et al. | |
| 6,060,989 A | 5/2000 | Gehlot | |
| 6,064,970 A | 5/2000 | McMillan et al. | |
| 6,116,369 A | 9/2000 | King et al. | |
| 6,128,559 A | 10/2000 | Saitou et al. | |
| 6,186,793 B1 | 2/2001 | Brubaker | |
| 6,188,950 B1 | 2/2001 | Tsutsumi et al. | |
| 6,265,978 B1 | 7/2001 | Atlas | |
| 6,301,530 B1 | 10/2001 | Tamura | |
| 6,366,207 B1 | 4/2002 | Murphy | |
| 6,389,351 B1 | 5/2002 | Egawa et al. | |
| 6,415,226 B1 | 7/2002 | Kozak | |
| 6,502,020 B2 | 12/2002 | Lang | |
| 6,502,035 B2 | 12/2002 | Levine | |
| 6,647,328 B2 | 11/2003 | Walker | |
| 6,675,094 B2 | 1/2004 | Russell et al. | |
| 6,707,378 B2 | 3/2004 | MacNeille et al. | |
| 6,732,024 B2 | 5/2004 | Rekow et al. | |
| 6,780,077 B2 | 8/2004 | Baumgartner et al. | |
| 6,868,386 B1 | 3/2005 | Henderson et al. | |
| 6,931,309 B2 | 8/2005 | Phelan et al. | |
| 6,982,635 B2 | 1/2006 | Obradovich | |
| 7,054,831 B2 | 5/2006 | Koenig | |
| 7,116,248 B2 | 10/2006 | Lu et al. | |
| 7,133,771 B1 | 11/2006 | Nesbitt | |
| 7,186,199 B1 | 3/2007 | Baxter, Jr. | |
| 7,242,112 B2 | 7/2007 | Wolf et al. | |
| 7,286,825 B2 | 10/2007 | Shishido et al. | |
| 7,304,589 B2 | 12/2007 | Kagawa | |
| 7,315,239 B2 | 1/2008 | Cheng et al. | |
| 7,339,483 B1 | 3/2008 | Farmer | |
| 7,353,111 B2 | 4/2008 | Takahashi et al. | |
| 7,356,516 B2 | 4/2008 | Richey et al. | |
| 7,366,892 B2 | 4/2008 | Spaur et al. | |
| 7,389,198 B1* | 6/2008 | Dimitriadis | G01S 13/92 702/142 |
| 7,546,206 B1 | 6/2009 | Miller et al. | |
| 7,610,210 B2 | 10/2009 | Helitzer et al. | |
| 7,650,211 B2 | 1/2010 | Wang et al. | |
| 7,657,370 B2 | 2/2010 | Nagase et al. | |
| 7,657,441 B2 | 2/2010 | Richey et al. | |
| 7,660,725 B2 | 2/2010 | Wahlbin et al. | |
| 7,664,589 B2 | 2/2010 | Etori et al. | |
| 7,739,087 B2 | 6/2010 | Qiu | |
| 7,805,321 B2 | 9/2010 | Wahlbin et al. | |
| 7,818,187 B2 | 10/2010 | Wahlbin et al. | |
| 7,821,421 B2 | 10/2010 | Tamir et al. | |
| 7,822,384 B2 | 10/2010 | Anschutz et al. | |
| 7,937,278 B1 | 5/2011 | Cripe et al. | |
| 7,966,118 B2 | 6/2011 | Kade | |
| 7,991,629 B2 | 8/2011 | Gay et al. | |
| 8,031,062 B2 | 10/2011 | Smith | |
| 8,065,169 B1 | 11/2011 | Oldham et al. | |
| 8,078,349 B1 | 12/2011 | Prada Gomez et al. | |
| 8,078,382 B2 | 12/2011 | Sugano et al. | |
| 8,086,523 B1 | 12/2011 | Palmer | |
| 8,090,598 B2 | 1/2012 | Bauer et al. | |
| 8,108,083 B2 | 1/2012 | Kameyama | |
| 8,139,109 B2 | 3/2012 | Schmiedel et al. | |
| 8,145,393 B2 | 3/2012 | Foster et al. | |
| 8,152,589 B2 | 4/2012 | Bowen et al. | |
| 8,160,809 B2 | 4/2012 | Farwell et al. | |
| 8,180,655 B1 | 5/2012 | Hopkins, III | |
| 8,195,394 B1 | 6/2012 | Zhu et al. | |
| 8,229,618 B2 | 7/2012 | Tolstedt et al. | |
| 8,280,308 B2 | 10/2012 | Anschutz et al. | |
| 8,280,752 B1 | 10/2012 | Cripe et al. | |
| 8,290,701 B2 | 10/2012 | Mason et al. | |
| 8,314,718 B2 | 11/2012 | Muthaiah et al. | |
| 8,326,473 B2 | 12/2012 | Simpson et al. | |
| 8,335,607 B2 | 12/2012 | Gatten et al. | |
| 8,352,112 B2 | 1/2013 | Mudalige | |
| 8,407,139 B1 | 3/2013 | Palmer | |
| 8,457,827 B1 | 6/2013 | Ferguson et al. | |
| 8,457,892 B2 | 6/2013 | Aso et al. | |
| 8,538,785 B2 | 9/2013 | Coleman et al. | |
| 8,549,318 B2 | 10/2013 | White et al. | |
| 8,554,468 B1 | 10/2013 | Bullock | |
| 8,566,126 B1 | 10/2013 | Hopkins, III | |
| 8,577,703 B2 | 11/2013 | McClellan et al. | |
| 8,595,037 B1 | 11/2013 | Hyde et al. | |
| 8,606,512 B1 | 12/2013 | Bogovich et al. | |
| 8,620,575 B2 | 12/2013 | Vogt et al. | |
| 8,620,693 B1 | 12/2013 | Schumann, Jr. | |
| 8,639,535 B1 | 1/2014 | Kazenas | |
| 8,659,436 B2 | 2/2014 | Ngo | |
| 8,676,466 B2 | 3/2014 | Mudalige | |
| 8,686,844 B1* | 4/2014 | Wine | G08G 1/20 340/438 |
| 8,718,861 B1* | 5/2014 | Montemerlo | B60W 30/00 701/26 |
| 8,725,311 B1 | 5/2014 | Breed | |
| 8,750,306 B2 | 6/2014 | Yousefi et al. | |
| 8,757,309 B2 | 6/2014 | Schmitt et al. | |
| 8,781,669 B1 | 7/2014 | Teller et al. | |
| 8,798,841 B1* | 8/2014 | Nickolaou | B62D 15/0265 701/23 |
| 8,799,036 B1 | 8/2014 | Christensen et al. | |
| 8,812,330 B1 | 8/2014 | Cripe et al. | |
| 8,818,725 B2 | 8/2014 | Ricci | |
| 8,930,269 B2 | 1/2015 | He et al. | |
| 8,949,016 B1* | 2/2015 | Ferguson | B60W 30/00 340/436 |
| 8,954,226 B1 | 2/2015 | Binion et al. | |
| 8,996,303 B1 | 3/2015 | Bogovich et al. | |
| 9,020,751 B1 | 4/2015 | Bogovich et al. | |
| 9,046,374 B2* | 6/2015 | Ricci | H04W 4/90 |
| 9,063,543 B2 | 6/2015 | An et al. | |
| 9,079,587 B1* | 7/2015 | Rupp | G05D 1/0289 |
| 9,141,582 B1 | 9/2015 | Brinkmann et al. | |
| 9,188,985 B1 | 11/2015 | Hobbs et al. | |
| 9,216,737 B1 | 12/2015 | Zhu et al. | |
| 9,262,787 B2* | 2/2016 | Binion | G07C 5/008 |
| 9,330,571 B2 | 5/2016 | Ferguson et al. | |
| 9,355,423 B1 | 5/2016 | Slusar | |
| 9,355,546 B2 | 5/2016 | Kim et al. | |
| 9,373,149 B2 | 6/2016 | Abhyanker | |
| 9,384,148 B2 | 7/2016 | Muttik et al. | |
| 9,390,451 B1 | 7/2016 | Slusar | |
| 9,433,843 B2 | 9/2016 | Morlock | |
| 9,457,814 B2 | 10/2016 | Kim et al. | |
| 9,495,874 B1 | 11/2016 | Zhu et al. | |
| 9,618,359 B2 | 4/2017 | Weast et al. | |
| 9,648,107 B1 | 5/2017 | Penilla et al. | |
| 9,679,487 B1 | 6/2017 | Hayward | |
| 9,715,711 B1 | 7/2017 | Konrardy et al. | |
| 9,739,627 B1 | 8/2017 | Chintakindi | |
| 9,758,039 B2 | 9/2017 | Hannon | |
| 9,767,516 B1 | 9/2017 | Konrardy et al. | |
| 9,792,656 B1 | 10/2017 | Konrady et al. | |
| 9,801,580 B2 | 10/2017 | Iizuka et al. | |
| 9,851,214 B1 | 12/2017 | Chintakindi | |
| 9,858,621 B1 | 1/2018 | Konrardy et al. | |
| 9,865,019 B2 | 1/2018 | Bogovich et al. | |
| 9,870,649 B1 | 1/2018 | Fields et al. | |
| 9,904,900 B2 | 2/2018 | Cao | |
| 9,922,374 B1 | 3/2018 | Vose et al. | |
| 9,928,432 B1 | 3/2018 | Sathyanarayana et al. | |
| 9,931,062 B2 | 4/2018 | Cavallaro et al. | |
| 9,932,033 B2 | 4/2018 | Slusar et al. | |
| 9,946,334 B2 | 4/2018 | Pala et al. | |

(56) References Cited

U.S. PATENT DOCUMENTS

| | | | |
|---|---|---|---|
| 9,953,300 B2 | 4/2018 | Connor | |
| 9,972,054 B1 | 5/2018 | Konrardy et al. | |
| 10,012,510 B2 | 7/2018 | Denaro | |
| 10,037,578 B2 | 7/2018 | Bogovich et al. | |
| 10,037,580 B2 | 7/2018 | Bogovich et al. | |
| 10,046,618 B2 | 8/2018 | Kirsch et al. | |
| 10,078,871 B2 | 9/2018 | Sanchez et al. | |
| 10,096,038 B2 | 10/2018 | Ramirez et al. | |
| 10,127,737 B1 | 11/2018 | Manzella et al. | |
| 2001/0020902 A1 | 9/2001 | Tamura | |
| 2001/0020903 A1 | 9/2001 | Wang | |
| 2001/0039509 A1 | 11/2001 | Dar et al. | |
| 2002/0022920 A1 | 2/2002 | Straub | |
| 2002/0024464 A1 | 2/2002 | Kovell et al. | |
| 2002/0095249 A1 | 7/2002 | Lang | |
| 2002/0111725 A1* | 8/2002 | Burge | G06Q 40/08 701/31.4 |
| 2002/0111738 A1 | 8/2002 | Iwami et al. | |
| 2002/0120396 A1 | 8/2002 | Boies et al. | |
| 2002/0128882 A1 | 9/2002 | Nakagawa et al. | |
| 2002/0178033 A1 | 11/2002 | Yoshioka et al. | |
| 2003/0043045 A1 | 3/2003 | Yasushi et al. | |
| 2003/0128107 A1 | 7/2003 | Wilkerson | |
| 2003/0182165 A1 | 9/2003 | Kato et al. | |
| 2003/0187704 A1 | 10/2003 | Hashiguchi et al. | |
| 2004/0021583 A1 | 2/2004 | Lau et al. | |
| 2004/0036601 A1 | 2/2004 | Obradovich | |
| 2004/0054452 A1 | 3/2004 | Bjorkman | |
| 2004/0068555 A1 | 4/2004 | Satou | |
| 2004/0098464 A1 | 5/2004 | Koch et al. | |
| 2004/0103006 A1 | 5/2004 | Wahlbin et al. | |
| 2004/0103010 A1 | 5/2004 | Wahlbin et al. | |
| 2004/0128613 A1 | 7/2004 | Sinisi | |
| 2004/0142678 A1 | 7/2004 | Krasner | |
| 2004/0153362 A1 | 8/2004 | Bauer et al. | |
| 2004/0236476 A1* | 11/2004 | Chowdhary | G06Q 30/0601 701/1 |
| 2004/0254698 A1 | 12/2004 | Hubbard et al. | |
| 2004/0260579 A1 | 12/2004 | Tremiti | |
| 2005/0091175 A9 | 4/2005 | Farmer | |
| 2005/0107951 A1 | 5/2005 | Brulle-Drews et al. | |
| 2005/0137757 A1 | 6/2005 | Phelan et al. | |
| 2005/0174217 A1 | 8/2005 | Basir et al. | |
| 2005/0228622 A1 | 10/2005 | Jacobi | |
| 2005/0256638 A1 | 11/2005 | Takahashi et al. | |
| 2005/0264404 A1 | 12/2005 | Franczyk et al. | |
| 2005/0273263 A1 | 12/2005 | Egami et al. | |
| 2005/0283503 A1 | 12/2005 | Hancock et al. | |
| 2005/0288046 A1 | 12/2005 | Zhao et al. | |
| 2006/0006990 A1 | 1/2006 | Obradovich | |
| 2006/0053038 A1* | 3/2006 | Warren | G06Q 40/08 705/4 |
| 2006/0055565 A1 | 3/2006 | Kawamata et al. | |
| 2006/0095301 A1 | 5/2006 | Gay | |
| 2006/0129313 A1 | 6/2006 | Becker et al. | |
| 2006/0129445 A1 | 6/2006 | McCallum | |
| 2006/0161341 A1 | 7/2006 | Haegebarth et al. | |
| 2006/0184321 A1 | 8/2006 | Kawakami et al. | |
| 2006/0206623 A1 | 9/2006 | Gipps et al. | |
| 2006/0221328 A1 | 10/2006 | Rouly | |
| 2006/0247852 A1 | 11/2006 | Kortge et al. | |
| 2006/0253307 A1 | 11/2006 | Warren et al. | |
| 2007/0021910 A1 | 1/2007 | Iwami et al. | |
| 2007/0027583 A1 | 2/2007 | Tamir et al. | |
| 2007/0032929 A1 | 2/2007 | Yoshioka et al. | |
| 2007/0136107 A1* | 6/2007 | Maguire | G06Q 40/08 705/4 |
| 2007/0167147 A1 | 7/2007 | Krasner et al. | |
| 2007/0182532 A1 | 8/2007 | Lengning et al. | |
| 2007/0216521 A1 | 9/2007 | Guensler et al. | |
| 2007/0256499 A1 | 11/2007 | Pelecanos et al. | |
| 2007/0257815 A1* | 11/2007 | Gunderson | G08G 1/16 340/903 |
| 2007/0282638 A1 | 12/2007 | Surovy | |
| 2008/0004802 A1 | 1/2008 | Horvitz | |
| 2008/0013789 A1 | 1/2008 | Shima et al. | |
| 2008/0033637 A1 | 2/2008 | Kuhlman et al. | |
| 2008/0059007 A1 | 3/2008 | Whittaker et al. | |
| 2008/0059351 A1 | 3/2008 | Richey et al. | |
| 2008/0091309 A1 | 4/2008 | Walker | |
| 2008/0091490 A1 | 4/2008 | Abrahams et al. | |
| 2008/0114542 A1 | 5/2008 | Nambata et al. | |
| 2008/0148409 A1 | 6/2008 | Ampunan et al. | |
| 2008/0161987 A1 | 7/2008 | Breed | |
| 2008/0167757 A1 | 7/2008 | Kanevsky et al. | |
| 2008/0243558 A1* | 10/2008 | Gupte | G06Q 40/08 705/4 |
| 2008/0258890 A1 | 10/2008 | Follmer et al. | |
| 2008/0288406 A1 | 11/2008 | Seguin et al. | |
| 2008/0319602 A1* | 12/2008 | McClellan | G07C 5/008 701/31.4 |
| 2009/0012703 A1 | 1/2009 | Aso et al. | |
| 2009/0024419 A1 | 1/2009 | McClellan et al. | |
| 2009/0063201 A1 | 3/2009 | Nowotarski et al. | |
| 2009/0079839 A1 | 3/2009 | Fischer et al. | |
| 2009/0115638 A1 | 5/2009 | Shankwitz et al. | |
| 2009/0140887 A1 | 6/2009 | Breed et al. | |
| 2009/0312945 A1 | 12/2009 | Sakamoto et al. | |
| 2010/0023183 A1 | 1/2010 | Huang et al. | |
| 2010/0030586 A1 | 2/2010 | Taylor et al. | |
| 2010/0042314 A1 | 2/2010 | Vogt et al. | |
| 2010/0131300 A1 | 5/2010 | Collopy et al. | |
| 2010/0131304 A1* | 5/2010 | Collopy | G06Q 30/0224 705/4 |
| 2010/0131307 A1 | 5/2010 | Collopy et al. | |
| 2010/0138244 A1 | 6/2010 | Basir | |
| 2010/0211270 A1 | 8/2010 | Chin et al. | |
| 2010/0250087 A1 | 9/2010 | Sauter | |
| 2010/0256852 A1 | 10/2010 | Mudalige | |
| 2010/0280751 A1 | 11/2010 | Breed | |
| 2010/0302371 A1 | 12/2010 | Abrams | |
| 2010/0324775 A1 | 12/2010 | Kermani et al. | |
| 2010/0332131 A1 | 12/2010 | Horvitz et al. | |
| 2011/0029170 A1 | 2/2011 | Hyde et al. | |
| 2011/0043350 A1 | 2/2011 | Ben David | |
| 2011/0071718 A1 | 3/2011 | Norris et al. | |
| 2011/0077028 A1 | 3/2011 | Wilkes et al. | |
| 2011/0161119 A1 | 6/2011 | Collins | |
| 2011/0173015 A1 | 7/2011 | Chapman et al. | |
| 2011/0202305 A1 | 8/2011 | Willis et al. | |
| 2011/0210867 A1 | 9/2011 | Benedikt | |
| 2012/0034876 A1 | 2/2012 | Nakamura et al. | |
| 2012/0053808 A1 | 3/2012 | Arai et al. | |
| 2012/0072243 A1 | 3/2012 | Collins et al. | |
| 2012/0083960 A1* | 4/2012 | Zhu | G05D 1/0214 701/23 |
| 2012/0101660 A1 | 4/2012 | Hattori | |
| 2012/0109418 A1 | 5/2012 | Lorber | |
| 2012/0123641 A1 | 5/2012 | Ferrin et al. | |
| 2012/0123806 A1 | 5/2012 | Schumann, Jr. et al. | |
| 2012/0173290 A1 | 7/2012 | Collins et al. | |
| 2012/0197669 A1 | 8/2012 | Kote et al. | |
| 2012/0209505 A1 | 8/2012 | Breed et al. | |
| 2012/0290146 A1 | 11/2012 | Dedes et al. | |
| 2012/0295592 A1 | 11/2012 | Peirce | |
| 2013/0006469 A1 | 1/2013 | Green et al. | |
| 2013/0006674 A1* | 1/2013 | Bowne | G06Q 10/0639 705/4 |
| 2013/0006675 A1 | 1/2013 | Bowne et al. | |
| 2013/0013179 A1 | 1/2013 | Lection et al. | |
| 2013/0018549 A1 | 1/2013 | Kobana et al. | |
| 2013/0030606 A1 | 1/2013 | Mudalige et al. | |
| 2013/0037650 A1 | 2/2013 | Heppe | |
| 2013/0046559 A1 | 2/2013 | Coleman et al. | |
| 2013/0052614 A1 | 2/2013 | Mollicone et al. | |
| 2013/0066511 A1 | 3/2013 | Switkes et al. | |
| 2013/0073321 A1 | 3/2013 | Hofmann et al. | |
| 2013/0090821 A1 | 4/2013 | Abboud et al. | |
| 2013/0116920 A1 | 5/2013 | Cavalcante et al. | |
| 2013/0131906 A1 | 5/2013 | Green et al. | |
| 2013/0144657 A1 | 6/2013 | Ricci | |
| 2013/0147638 A1 | 6/2013 | Ricci | |
| 2013/0166325 A1 | 6/2013 | Ganapathy et al. | |

(56) References Cited

U.S. PATENT DOCUMENTS

| | | |
|---|---|---|
| 2013/0179198 A1 | 7/2013 | Bowne et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204645 A1 | 8/2013 | Lehman et al. |
| 2013/0212659 A1 | 8/2013 | Maher et al. |
| 2013/0218603 A1 | 8/2013 | Hagelstein et al. |
| 2013/0218604 A1 | 8/2013 | Hagelstein et al. |
| 2013/0226441 A1* | 8/2013 | Horita ............... G01C 21/3469 701/118 |
| 2013/0250933 A1 | 9/2013 | Yousefi et al. |
| 2013/0253809 A1 | 9/2013 | Jones et al. |
| 2013/0261944 A1 | 10/2013 | Koshizen |
| 2013/0297097 A1 | 11/2013 | Fischer et al. |
| 2013/0304513 A1* | 11/2013 | Hyde ..................... G06Q 40/08 705/4 |
| 2013/0304514 A1* | 11/2013 | Hyde ..................... G06Q 40/08 705/4 |
| 2013/0311002 A1* | 11/2013 | Isaac ..................... G07C 5/008 701/2 |
| 2014/0037938 A1 | 2/2014 | Li et al. |
| 2014/0074512 A1 | 3/2014 | Hare et al. |
| 2014/0080098 A1 | 3/2014 | Price |
| 2014/0088855 A1* | 3/2014 | Ferguson ............... G08G 1/166 701/117 |
| 2014/0108058 A1 | 4/2014 | Bourne et al. |
| 2014/0113619 A1* | 4/2014 | Tibbitts .................. G07C 5/008 455/419 |
| 2014/0136414 A1 | 5/2014 | Abhyanker |
| 2014/0139341 A1* | 5/2014 | Green .................... B60K 28/06 340/576 |
| 2014/0156133 A1* | 6/2014 | Cullinane .............. B60K 35/00 701/23 |
| 2014/0156134 A1* | 6/2014 | Cullinane .............. B60W 30/00 701/23 |
| 2014/0172221 A1* | 6/2014 | Solyom ............. B62D 15/0285 701/23 |
| 2014/0172290 A1 | 6/2014 | Prokhorov et al. |
| 2014/0180723 A1 | 6/2014 | Cote et al. |
| 2014/0210644 A1 | 7/2014 | Breed |
| 2014/0257871 A1 | 9/2014 | Christensen et al. |
| 2014/0257873 A1 | 9/2014 | Hayward et al. |
| 2014/0266795 A1 | 9/2014 | Tseng et al. |
| 2014/0272810 A1* | 9/2014 | Fields ................ G01C 21/3676 434/65 |
| 2014/0278586 A1 | 9/2014 | Sanchez et al. |
| 2014/0300458 A1 | 10/2014 | Bennett |
| 2014/0300494 A1 | 10/2014 | Tseng et al. |
| 2014/0303827 A1* | 10/2014 | Dolgov ................. B60W 30/00 701/23 |
| 2014/0310075 A1 | 10/2014 | Ricci |
| 2014/0310186 A1 | 10/2014 | Ricci |
| 2014/0333468 A1* | 11/2014 | Zhu ........................ G01S 17/95 342/54 |
| 2014/0350970 A1 | 11/2014 | Schumann, Jr. et al. |
| 2014/0358413 A1* | 12/2014 | Trombley ................ G06G 1/00 701/118 |
| 2014/0379384 A1 | 12/2014 | Duncan et al. |
| 2014/0379385 A1 | 12/2014 | Duncan et al. |
| 2014/0380264 A1 | 12/2014 | Misra et al. |
| 2015/0019266 A1 | 1/2015 | Stempora |
| 2015/0025917 A1 | 1/2015 | Stempora |
| 2015/0057931 A1 | 2/2015 | Pivonka |
| 2015/0081404 A1* | 3/2015 | Basir .................. G06Q 30/0207 705/14.1 |
| 2015/0088334 A1 | 3/2015 | Bowers et al. |
| 2015/0088550 A1 | 3/2015 | Bowers et al. |
| 2015/0112543 A1 | 4/2015 | Binion et al. |
| 2015/0112730 A1* | 4/2015 | Binion ................... G06Q 40/08 705/4 |
| 2015/0112731 A1 | 4/2015 | Binion et al. |
| 2015/0112733 A1 | 4/2015 | Baker et al. |
| 2015/0120124 A1* | 4/2015 | Bartels .................. B60W 50/10 701/23 |
| 2015/0134181 A1 | 5/2015 | Ollis |
| 2015/0142244 A1* | 5/2015 | You ........................ G01C 21/00 701/23 |
| 2015/0149017 A1* | 5/2015 | Attard ................ B60W 30/182 701/23 |
| 2015/0149019 A1 | 5/2015 | Pilutti et al. |
| 2015/0158486 A1* | 6/2015 | Healey .................. B60W 30/12 701/23 |
| 2015/0161738 A1 | 6/2015 | Stempora |
| 2015/0166059 A1 | 6/2015 | Ko |
| 2015/0166062 A1* | 6/2015 | Johnson ................ B60W 30/12 701/41 |
| 2015/0166069 A1* | 6/2015 | Engelman ............. B60W 30/12 701/23 |
| 2015/0170287 A1* | 6/2015 | Tirone ................... G06Q 40/08 705/4 |
| 2015/0175168 A1* | 6/2015 | Hoye ..................... B60W 40/09 434/64 |
| 2015/0179062 A1 | 6/2015 | Ralston et al. |
| 2015/0187013 A1* | 7/2015 | Adams ............... G06Q 30/0283 705/4 |
| 2015/0187014 A1 | 7/2015 | Adams et al. |
| 2015/0187015 A1 | 7/2015 | Adams et al. |
| 2015/0187019 A1* | 7/2015 | Fernandes .............. G06Q 40/08 705/4 |
| 2015/0194055 A1 | 7/2015 | Maass |
| 2015/0217763 A1 | 8/2015 | Reichel et al. |
| 2015/0242953 A1 | 8/2015 | Suiter |
| 2015/0248131 A1* | 9/2015 | Fairfield ............... G05D 1/0044 701/2 |
| 2015/0254955 A1 | 9/2015 | Fields et al. |
| 2015/0266455 A1 | 9/2015 | Wilson |
| 2015/0294422 A1 | 10/2015 | Carver et al. |
| 2016/0009291 A1 | 1/2016 | Pallett et al. |
| 2016/0036558 A1 | 2/2016 | Ibrahim et al. |
| 2016/0065116 A1 | 3/2016 | Conger |
| 2016/0086285 A1 | 3/2016 | Peters et al. |
| 2016/0086393 A1 | 3/2016 | Collins et al. |
| 2016/0089954 A1 | 3/2016 | Villanueva |
| 2016/0090097 A1 | 3/2016 | Grube et al. |
| 2016/0096531 A1* | 4/2016 | Hoye .................... B60W 50/14 701/23 |
| 2016/0163198 A1 | 6/2016 | Dougherty |
| 2016/0167652 A1 | 6/2016 | Slusar |
| 2016/0189303 A1 | 6/2016 | Fuchs |
| 2017/0011465 A1 | 1/2017 | Anastassov et al. |
| 2017/0021764 A1* | 1/2017 | Adams ..................... B60Q 9/00 |
| 2017/0120929 A1 | 5/2017 | Siddiqui et al. |
| 2017/0154636 A1 | 6/2017 | Geiger et al. |
| 2017/0210288 A1 | 7/2017 | Briggs et al. |
| 2017/0221149 A1 | 8/2017 | Hsu-Hoffman et al. |
| 2018/0037635 A1 | 2/2018 | Grimm et al. |
| 2018/0202822 A1 | 7/2018 | DeLizio |
| 2018/0251128 A1 | 9/2018 | Penilla et al. |
| 2018/0376357 A1 | 12/2018 | Tavares Coutinho et al. |
| 2019/0101649 A1 | 4/2019 | Jensen |

FOREIGN PATENT DOCUMENTS

| | | |
|---|---|---|
| EP | 1296305 A1 | 3/2003 |
| EP | 2293255 A1 | 3/2011 |
| EP | 2471694 A2 | 7/2012 |
| EP | 3303083 A1 | 4/2018 |
| WO | 2001039090 A1 | 5/2001 |
| WO | 2005108928 A1 | 11/2005 |
| WO | 2007102405 A1 | 9/2007 |
| WO | 2008067872 A1 | 6/2008 |
| WO | 2008096376 A1 | 8/2008 |
| WO | 2012014042 A2 | 2/2012 |
| WO | 2012150591 A2 | 11/2012 |
| WO | 2013012926 A1 | 1/2013 |
| WO | 2013126582 A1 | 8/2013 |
| WO | 2013160908 A2 | 10/2013 |
| WO | 2014148975 A1 | 9/2014 |

(56) References Cited

FOREIGN PATENT DOCUMENTS

| WO | 2016028228 A1 | 2/2016 |
|---|---|---|
| WO | 2016122881 A1 | 8/2016 |
| WO | 2016200762 A1 | 12/2016 |

OTHER PUBLICATIONS

Zhu et al., U.S. Appl. No. 61/391,271, filed Oct. 8, 2010; Appendix to the Specification, "Appendix B," "User Interface for Displaying Internal State of Autonomous Driving System"; 37 pages (Year: 2010).*
Ballard,T., Melton, A., & Sealy, I. (Jan. 1, 2004). "Driver Monitors: Improving Transportation Safety and Enhancing Performance Through Behavioral Change". Society of Petroleum Engineers (Year: 2004).*
Auto Insurance Discounts, Liberty Mutual Insurance, downloaded from http://www.libertymutual.com/auto-insurance/auto-insurance-coverage/auto-insurance-discounts, Jan. 8, 2014, 2 pages.
Autonomous Vehicles Regulations, California Department of Motor Vehicles, 2011, downloaded from www.dmv.ca.gov/vr/autonomous/auto.htm, Jan. 2, 2014, 3 pages.
Sharma, Aroma, Autonomous Vehicle Conf Recap 2012: "Driving the Future: The Legal Implications of Autonomous Vehicles," High Tech Law Institute, downloaded from law.scu.edu/hightecht/autonomousvehicleconfrecap2012/, Jan. 2, 2014, 7 pages.
Strumpf, Dan, "Corporate News: Driverless Cars Face Issues of Liability", Strumpf Dan, The Wall Street Journal Asia [Hong Kong ] Jan. 29, 2013: 19, downloaded from http://search.proquest.com.ezproxy, Jan. 8, 2014, 2 pages.
Lienert, Anita, Drivers Would Opt for Autonomous Cars to Save on Insurance, Study Finds: Published: Nov. 7, 2013, downloaded from www.edmunds.com/car-news/drivers-would-opt-for-autonomous-cars-to-save-on-insurance-study-finds.html on Jan. 2, 2014, 6 pages.
Neumann, Peter G. and Contributors, "Risks to the Public," ACM SIGSOFT Software Engineering Notes, Jul. 2012 vol. 37 No. 4, pp. 20-29.
Kirkpatrick, Keith, "Legal issues with Robots," Communications of the ACM, Nov. 2013, vol. 56 No. 11, pp. 17-19.
Ingolfo, Silvia, and Silva Souza, Vitor E., "Law and Adaptivity in Requirements Engineering," SEAMS 2013, pp. 163-168.
O'Donnell, Anthony, "Prepare for Deep Auto Insurance Premium Drop Scenario, Celent Report Advises," Insurance & Technology, May 8, 2012, downloaded from http://www.insurancetech.com/claims/prepare-for-deep-auto-insurance-premium/232901645?printer_friendly=this-page, Jan. 9, 2014, 3 pages.
Top issues: An annual report "The insurance industry in 2013; Strategy: Reshaping auto insurance", vol. 5, 2013, 6 pages.
O'Donnell, Anthony, "Rapid Emergence of Driverless Cars Demands Creation of Legal Infrastructure, Stanford Scholar Says," Insurance & Technology—Online, Jan. 3, 2013, downloaded from http: | | search.proquest.com .ezproxy.apollolibrary.com/ docview / 12 66 314 720 /fulltext/ 142 DA8916CC2 E861A14/ 11 ?accountid =3 5812, Jan. 8, 2014, 2 pages.
"Self-driving cars: The next revolution" (kpmg.com | cargroup.org), 2012, 36 pages.
The autonomous car: The road to driverless driving, May 30, 2013, downloaded from analysis.telematicsupdate.com/v2x-safety/autonomous-car-road-driverless-driving on Jan. 2, 2014, 6 pages.
Ruquet, Mark E., "Who Insures a Driverless Car"? Property & Casualty 360, Oct. 1, 2012, downloaded from http:/ / search.proquest.com on Jan. 8, 2014, 2 pages.
Neil, Dan, "Who's Behind the Wheel? Nobody. The driverless car is coming. And we all should be glad it is," Wall Street Journal (Online) [New York, N.Y] Sep. 24, 2012, downloaded from http:/ / search.proquest.com on Jan. 8, 2014, 4 pages.
Bylund, Anders, "Would You Buy a Self-Driving Car to Save 80% on Auto Insurance?" The Motley Fool, Nov. 27, 2013, http://www.dailyfinance.com/2013/11/27/would-you-buy-a-self-driving-car-to-save-80-on-car/, 2 pages.
Litman, Todd, "Autonomous Vehicle Implementation Predictions Implications for Transport Planning," Victoria Transport Policy Institute, Dec. 23, 2013, 19 pages.
Light, Donald, "A Scenario: The End of Auto Insurance," May 8, 2012, downloaded Nov. 11, 2013 from ww.celent.com/reports/scenario-end-auto-insurance, 2 pages.
"Driver Assistance Systems," Robert Bosch GmbH, downloaded Oct. 27, 2013 from www.bosch-automotivetechnology.us/en_us/us/driving_comfort_1/driving_comfort_systems_for_passenger_cars_2/driver_assistance_systems_5/driver_assistan . . . 12 pages.
"Autonomous Car," Wikipedia, the free encyclopedia, downloaded Nov. 11, 2013 from en.wikipedia.org/wiki/Autonomous_car#cite_ref-28, 20 pages.
"Schlaue Autos von A bis Z." Encyclopedia, downloaded Oct. 27, 2013 from www.bester-beifahrer.de/startseite/lexikon/, 15 pages.
"Chassis Systems Control, Adaptive Cruise Control: More comfortable driving," Robert Bosch GmbH, Brochure downloaded Oct. 26, 2013, 4 pages.
"Get Ready for Automated Cars," Houston Chronicle, Sep. 11, 2012, downloaded Nov. 11, 2013, 1 page.
Levy, Steven, Salmon, Felix, Stokes, Jon, "Artificial Intelligence is Here. In Fact, It's All Around Us. But It's Nothing Like We Expected," Jan. 2011, 14 pages.
"Driverless cars study: 1 in 5 would let computers do the driving," Nov. 4, 2013, downloaded Dec. 19, 2013 from http://www.carinsurance.com/press/driverless-cars-survey-results.aspx, 2 pages.
Shladover, Steven E. "What if Cars Could Drive Themselves," ACCESS Magazine, University of California Transportation Center, UC Berkeley, Apr. 1, 2000, downloaded Dec. 19, 2013, 7 pages.
Kim, Mun Hyun, Dickerson, Julie, Kosko, Bart, "Fuzzy throttle and brake control for platoons of smart cars," University of Southern California, revised Aug. 1995, downloaded Dec. 19, 2013, 26 pages.
"A velocity control strategy for vehicular collision avoidance system," Abstract downloaded on May 9, 2013 from ieeexplore.ieee.org/xpl/articleDetails.jsp?tp=&arnumber=1626838&contentType=Conference+Publications&queryText%3DA+velocity+control+strategy+for . . . , 1 page.
"Fuzzy system representation of car-following phenomena," Abstract downloaded on May 9, 2013 from ieeexplore.ieee.org/xpl/articleDetails.jsp?tp=&arnumber=527798&contentType=Conference+Publications&queryText%3DFuzzy+system+representation+of . . . , 1 page.
"Direct adaptive longitudinal control of vehicle platoons," Abstract downloaded on May 9, 2013 from ieeexplore.ieee.org/xpl/articleDetails.jsp?tp=&arnumber=917908&contentType=Journals+%26+Magazines&queryText%3DDirect+adaptive+longitudinal+c . . . , 1 page.
Sharma, Devansh, "Development of Leader-Follower Robot in IIT BOMBAY," 4 pages.
Noguchi, Noboru, Will, Jeff, Reid, Joh, and Zhang, Qin, "Development of a master-slave robot system for farm operations," Computers and Electronics in Agriculture 44 (2004), 19 pages.
"Project SARTRE (Safe Road Trains for the Environment)," Road Traffic Technology, downloaded on May 9, 2013 from www.roadtraffic-technology.com/projects/the-sartre-project/, 3 pages.
"A semi-autonomous tractor in an intelligent master-slave vehicle system," Oct. 2010, vol. 3, Issue 4, pp. 263-269, downloaded Dec. 19, 2013 from http://link.springer.com/article/10.1007%2Fs11370-010-0071-6, 4 pages.
"Development of an intelligent master-slave system between agricultural vehicles," Abstract downloaded on Dec. 19, 2013 from http://ieeexplore.ieee.org/xpl/login.jsp?tp=&arnumber=5548056&url=http%3A%2F%2Fi . . . , 1 page.
"A leader-follower formation flight control scheme for UAV helicopters," Abstract downloaded on Dec. 19, 2013 from http://ieeexplore.ieee.org/xpl/login.jsp?tp=&arnumber=4636116&url=http%3A%2F%2Fi . . . , 1 page.
VentureBeat.com webpage; "Cisco and NXP encourage car communication to make driving safer" www.venturebeat.com/2013/01/04/cisco-and-nxp-encourage-car-communication-to-make-driving-safer/, Rebecca Grant dated Jan. 4, 2013.
Yang et al., "A vehicle-to-vehicle communication protocol for cooperative collision warning"; Aug. 2004.

(56) References Cited

OTHER PUBLICATIONS

Festag et al., "Vehicle-to-vehicle and road-side sensor communication for enhanced road safety"; Nov. 2008.
Zalstein, David, Car Advice. com webpage, "First large-scale vehicle-to-vehicle communication technology test unveiled" dated Aug. 22, 2012, www.caradvice.com.au/187379/first-large-scale-vehicle-to-vehicle-communication-technology-test-unveiled/basic-rgb-4/, 3 pages.
BMW.com webpage; "BMW Technology Guide: Car-to-car communication" www.bmw.com/com/en/insights/technology/technology_guide/articles/cartocar_communication.html; downloaded Apr. 5, 2013.
NEC.com webpage; "Car2Car Communication" www/nec.com/en/global.onlinetv/en/society/car_commu_l:html; downloaded Apr. 5, 2013.
Xu, Qing et al., "Vehicle-to-Vehicle Safety Messaging in DSRC"; 2004.
EE Herald webpage, "DSRC Packet Sniffer, a vehicle-to-vehicle communication technology is under demo"; www.eeherald.com/section/news/nw10000198.html; dated Nov. 22, 2008.
Bai, Fan et al., "Reliability Analysis of DSRC Wireless Communication for Vehicle Safety"; Sep. 2006.
Kotani, Kazuya et al., "Inter-Vehicle Communication Protocol for Cooperatively Capturing and Sharing" Intersection Video; date unkown but believed to be before 2011.
BC Technology Webpage; "CarCom Intercom System"; www.bctechnologyltd.co.uk/clarson-intercom-system-brochure.htm; downloaded May 29, 2013.
Wolf Intercom webpage; "Wolf Intercom Systems"; http://wolfintercom.com/; downloaded May 29, 2013.
Telephonics Webpage; "Integrated Communication Systems Wired & Wireless Secure Intercommunications"; www.telephonics.com/netcom.asp; downloaded May 29, 2013.
Car-to-Car webpage; "Car-2-Car Communication"; www.car-to-car.org/index.php?id=8; downloaded May 29, 2013.
"Auto-Insurance—Driving into the sunset?", Bonny Kurian, Tata Consultancy Services, 2013.
"Autonomous Vehicle Technology: Consideration for the Auto Insurance Industry", Christine O'Brien, University Transportation Resource Center (The 2nd Connected Vehicles Symposium, Rutgers University), Jun. 17, 2013.
"Autonomous Vehicle Program: A Guide for Policymakers", James M. Anderson et al., Rand Corporation: Transportation, Space, and Technology Program, 2014.
"The Coming Collision Between Autonomous Vehicles and the Liability System", Gary E. Marchant et al., Santa Clara Law Review (vol. 52: No. 4 (Article 6)), Dec. 17, 2012.
"The Munix Advantage", AUMA, retrieved Apr. 8, 2014, <http://www.auma.ca/live/digitalAssets/71/71248_MUNIX_onepager.pdf>.
"The Use of Occupation and Education Factors in Automobile Insurance", State of New Jersey: Department of Banking and Insurance, Apr. 2008.
"Preliminary Statement of Policy Concerning Automated Vehicles", National Highway Traffic Safety Administration, retrieved Jun. 9, 2014.
"Summary of levels of Driving Automation for On-Road Vehicles", Bryant Walker Smith, Stanford Law School: The Center for Internet and Society, Dec. 18, 2013, <http://cyberlaw.stanford.edu/blog/2013/12/sae-levels-driving-automation>.
Quad City Intersection Traffic Accident Study, Davenport-Rock Island-Moline Urbanized Area 1993 data, Bi-State Regional Commission, Mar. 1996; http://ntl.bts.gov/lib/000/300/338/00338.pdf; 78 pages; downloaded Apr. 8, 2008.
Oct. 3, 2016—U.S. Non-Final Office Action—U.S. Appl. No. 14/733,576.
Oct. 20, 2016—U.S. Non-Final Office Action—U.S. Appl. No. 14/816,336.
Oct. 21, 2016—U.S. Non-Final Office Action—U.S. Appl. No. 14/862,266.
Oct. 24, 2016—U.S. Non-Final Office Action—U.S. Appl. No. 14/816,299.
Oct. 17, 2016—U.S. Office Action—U.S. Appl. No. 13/892,598.
Nov. 29, 2016—U.S. Non-Final Office —U.S. Appl. No. 14/458,796.
Dec. 12, 2016—U.S. Notice of Allowance—U.S. Appl. No. 14/832,197.
Dec. 19, 2016—U.S. Final Office Action—U.S. Appl. No. 14/607,433.
Cohda Wireless webpage; www.cohdawireless.com/default.html; downloaded May 29, 2013.
Eichler, Stephen et al., "Car-to-Car Communication" dated Oct. 2006.
Oki Webpage "OKI Develops World's First DSRC Inter-vehicle Communication Attachment for Mobile Phones to Help Pedestrian Safety" dated Jan. 8, 2009.
Zeng X. Yin, K. and Ge, H., "Hazardous Driving Prediction System," Submission to The Connected Vehicle Technology Challenge,Sep. 24, 2014, 20 pages.
Jan. 21, 2015—U.S. Non-Final Office Action—U.S. Appl. No. 14/163,719.
Geographic Information Systems Using CODES Linked Data (Crash Outcome Data Evaluation System), U.S. Department of Transportation National Highway Traffic Safety Administration, Apr. 2001; http://ntl.bts.gov/lib/11000/11100/11149/809-201.pdf; 44 pages; downloaded Apr. 8, 2008.
Final Report: What Value May Geographic Information Systems Add to the Art of Identifying Crash Countermeasures? John S. Miller, Senior Research Scientist, Virginia Transportation Research Council, Charlottesville, Virginia, Apr. 1999; http://www.virginiadot.org/vtrc/main/online_reports/pdf/99-r13.pdf; 44 pages; downloaded Apr. 8, 2008.
Mapping the Streets of the World, Hilmar Schmundt, Speigel Online, May 12, 2006 03:37 PM, High Technology; http://www.spiegel.de/international/spiegel/0,1518,druck-415848,00.html; 2 pages; downloaded Jun. 25, 2008.
Patents: At the forefront of technological innovation, Printed from the Teleatlas.com website, 2007; http://www.teleatlas.com/WhyTeleAtlas/Innovation/Patents/index.htm; 1 page; downloaded Jun. 25, 2008.
Digital Collection—Metadata View; Quad City Intersection Traffic Accident Study: 1993 Data; http://ntlsearch.bts.gov/tris/record/ntl/338.html; 2 pages; downloaded Jun. 25, 2008.
Advanced Tracking Technologies, Inc., Shadow Tracker Prov5 Track Detail Map, http://www.advantrack.com/map_pro_3.htm; 1 page; downloaded Jun. 25, 2008.
Advanced Tracking Technologies, Inc.; Track Playback; http://www.advantrack.com/Animated-Track-Playback.htm; 1 page; downloaded Jun. 25, 2008.
What is Geocoding?, http://www.trpc.org/programs/gis/geocode.htm; 5 pages; downloaded Jun. 25, 2008.
Logistics, Not Consumers, Best Early Market for Premium Traffic Information, Sep. 25, 2006; http://auto.ihs.com/news/2006/abi-premium-traffic.htm; 2 pages; downloaded Jun. 25, 2008.
Property/Casualty Insurance Gaining Position With Technology; Telematics, the use of Wireless communications and Global Positioning System (GPS) tracking, may soon change the way automobile insurance, both personal and commercial, is priced. Individual rating of a driver, to supplement class rating, now appears to be feasible.; http://www.towersperrin.com/TILLINGHAST/publications/publications/emphasis/Emphasis_2005_3/Holderedge.pdf; 4 pages; downloaded Apr. 8, 2008.
IVOX's Driver Score; Personal Lines; Benefits to using IVOX DriverScore; http://www.ivosdata.com/personal_lines.html; 1 page; downloaded Jul. 25, 2008.
Group1 Software; Point-Level Geocoding Option Geocoding Enrichment Solution; http://www.g1.com/PDF/Product/PointLevelGeocode.pdf; 2 pages; downloaded Apr. 8, 2008.
Integrated Enterprise Geo-Spatial Technology—Insurance Risk Examples by Brady Foust, Ph.D., Howard Botts, Ph.D. and Margaret Miller, Ph.D., Jan. 27, 2006; http://www.directionsmag.com/printer.php?artcicle_id-2081; 2 pages; downloaded Jun. 25, 2008.
How the Discounts Work; www.SaveAsYouDrive.com; http://www.saveasyouddrive.com/page.asp?pageid=34&print=true; 2 pages; downloaded Jun. 25, 2008.

(56) References Cited

OTHER PUBLICATIONS

Jan. 29, 2016—U.S. Notice of Allowance and Fee(s) Due—U.S. Appl. No. 14/163,741.
Mar. 17, 2016—U.S. Notice of Allowance and Fee(s) Due—U.S. Appl. No. 14/163,761.
Apr. 7, 2016—U.S. Non-Final Office Action—U.S. Appl. No. 14/163,719.
Mar. 18, 2016—(WO) International Search Report—App PCT/US2016/013204.
Mar. 18, 2016—(WO) Search Report and Written Opinion—App PCT/US2016/013204.
Aug. 31, 2016—(WO)—International Search Report—App PCT/US2016/036136.
Wardzinski, Dynamic risk assessment in autonomous vehicles motion planning, IEEE, 1st International Conference on Information Technology, Gdansk, May 18-21, 2008 [retrieved on Jul. 25, 2016], Retrieved from the Internet, <URL:http://kio.pg.gda.pl/lag/download/2008-IEEE%20ICIS-Dynamic%20Risk%20Assessment.pdf>, 4 pages.
Sep. 9, 2016—U.S. Notice of Allowance—U.S. Appl. No. 14/163,719.
Sep. 9, 2016—U.S. Non-Final Office Action—U.S. Appl. No. 14/697,131.
Sep. 9, 2016—U.S. Non-Final Office Action—U.S. Appl. No. 14/697,141.
Sep. 9, 2016—U.S. Non-Final Office Action—U.S. Appl. No. 14/697,153.
Oct. 6, 2016—U.S. Non-Final Office Action—U.S. Appl. No. 14/184,272.
Apr. 5, 2017—U.S. Final Office Action—U.S. Appl. No. 14/184,272.
Jun. 1, 2017—U.S. Final Office Action—U.S. Appl. No. 14/458,796.
Jun. 13, 2017—U.S. Final Office Action—U.S. Appl. No. 14/485,764.
Dec. 29, 2016—U.S. Non-Final Office Action—U.S. Appl. No. 14/458,764.
Jan. 4, 2017—U.S. Non-Final Office Action—U.S. Appl. No. 14/697,131.
Jan. 4, 2017—U.S. Non-Final Office Action—U.S. Appl. No. 14/697,141.
Jan. 13, 2017—U.S. Non-Final Office Action—U.S. Appl. No. 14/458,744.
Jan. 19, 2017—U.S. Final Office Action—U.S. Appl. No. 14/673,150.
Feb. 10, 2017—U.S. Final Office Action—U.S. Appl. No. 14/733,576.
Aug. 15, 2017—U.S. Final Office Action—U.S. Appl. No. 14/458,744.
Sep. 7, 2017—U.S. Non-Final Office Action—U.S. Appl. No. 14/458,764.
Oct. 3, 2017—U.S. Non-Final Office Action—U.S. Appl. No. 14/458,796.
Dec. 26, 2017—U.S. Notice of Allowance—U.S. Appl. No. 14/163,719.
Dec. 27, 2017—U.S. Non-Final Office Action—U.S. Appl. No. 14/697,131.
Feb. 7, 2018—U.S. Non-Final Office Action—U.S. Appl. No. 15/166,638.
Feb. 12, 2018—U.S. Notice of Allowance—U.S. Appl. No. 14/673,150.
Mar. 9, 2018—U.S. Non-Final Office Action—U.S. Appl. No. 15/013,523.
Mar. 14, 2018—U.S. Non-Final Office Action—U.S. Appl. No. 14/607,433.
Mar. 13, 2018—U.S. Notice of Allowance—U.S. Appl. No. 15/206,521.
May 18, 2018—U.S. Non-Final Office Action—U.S. Appl. No. 14/458,744.
Apr. 19, 2018—U.S. Final Office Action—U.S. Appl. No. 14/458,764.
Mar. 29, 2018—U.S. Notice of Allowance—U.S. Appl. No. 14/697,141.
Apr. 2, 2018—U.S. Notice of Allowance—U.S. Appl. No. 14/697,153.
Mar. 30, 2018—U.S. Notice of Allowance—U.S. Appl. No. 14/816,299.
May 15, 2018—U.S. Notice of Allowance—U.S. Appl. No. 14/163,719.
May 17, 2018—U.S. Notice of Allowance—U.S. Appl. No. 14/697,131.
Apr. 2, 2018—U.S. Non-Final Office Action—U.S. Appl. No. 14/816,336.
Jan. 8, 2018—U.S. Non-Final Office Action—U.S. Appl. No. 15/015,623.
Jun. 14, 2018—U.S. Final Office Action—U.S. Appl. No. 14/458,796.
May 1, 2019—U.S. Non-Final Office Action—U.S. Appl. No. 14/458,764.
May 3, 2019—U.S. Non-Final Office Action—U.S. Appl. No. 14/458,796.
May 15, 2019—(EP) Extended European Search Report—App. 16808098.4.
Mar. 21, 2019—(CA) Office Action—App. 2,975,087.
Jun. 6, 2018—U.S. Notice of Allowance—U.S. Appl. No. 15/015,623.
Jun. 5, 2018—(CA) Office Action—App 2,975,087.
Aug. 14, 2018—U.S. Notice of Allowance—U.S. Appl. No. 14/607,433.
Sep. 4, 2018—U.S. Notice of Allowance—U.S. Appl. No. 14/816,336.
Sep. 17, 2018—U.S. Notice of Allowance—U.S. Appl. No. 15/168,638.
"Background on Self-Driving Cars and Insurance", Auto Technology, Insurance Information Institute, Inc. (Year 2018).
Oct. 11, 2018—U.S. Notice of Allowance—U.S. Appl. No. 1/206,521.
Dec. 6, 2018—U.S. Notice of Allowance—U.S. Appl. No. 15/013,523.
Baronti, et al, "Distributed Sensor for Steering Wheel Grip Force Measurement in Driver Fatigue Detection," Department of Engineering and Information, University of Pisa, Italy, pp. 1-4. (Year: 2009).
Ji, et al, "Real-Time Nonintrusive Monitoring and Prediction of Driver Fatigue," IEEE Transactions on Vehicular Technology, vol. 53, No. 4, pp. 1-17 (Year: 2004).
Oct. 22, 2018 (CA) Office Action—App. 2,988,134.
Dec. 6, 2018 U.S. Notice of Allowance—App. 15/013,523.
Jan. 8, 2019—U.S. Notice of Allowance—U.S. Appl. No. 15/206,521.
Jan. 28, 2019—U.S. Final Office Action—U.S. Appl. No. 14/458,744.
"Your Questions Answered: Driverless Cars", Stephen Harris, The Engine (Online), Feb. 17, 2014; n/a. ProQuest. Web. Jan. 18, 2019 (Year 2014).
Feb. 11, 2019—(EP) Supplementary Search Report—EP16743839.9.
Apr. 5, 2019—U.S. Notice of Allowance—U.S. Appl. No. 15/166,638.
Jun. 18, 2019 U.S. Notice of Allowance and Fees Due—U.S. Appl. No. 15/206,521.
Jun. 26, 2019—U.S. Non-Final Office Action—U.S. Appl. No. 14/458,744.
Jul. 25, 2019—U.S. Non-Final Office Action—U.S. Appl. No. 16/294,103.
Aug. 27, 2019—U.S. Notice of Allowance—U.S. Appl. No. 15/166,638.
Aug. 22, 2019—U.S. Non-Final Office Action—U.S. Appl. No. 15/974,861.
Aug. 22, 2019—U.S.Non-Final Office Action—U.S. Appl. No. 16/021,593.
Aug. 27, 2019—U.S. Non-Final Office Action—U.S. Appl. No. 16/021,678.
Oct. 30, 2019—U.S. Notice of Allowance—U.S. Appl. No. 14/458,764.
Wu et al, "Petri Net Modeling of the Cooperation Behavior of a Driver and a Copilot in an Advanced Driving Assistance System", IEEE Transactions on Intelligent Transportation Systems, vol. 12, Issue 4, Dec. 1, 2011, pp. 977-989, Year 2011.
Oct. 31, 2019—U.S. Notice of Allowance—U.S. Appl. No. 14/458,744.
Nov. 4, 2019—U.S. Notice of Allowance—U.S. Appl. No. 14/458,796.
J.F. Coughlin, B. Reimer, B. Mehler, "Monitoring Managing and Motivating Driver Safety and Well-Being", IEEE Pervasive Comput., vol. 10 No. 3, pp. 14-21, Year 2011.
Nov. 25, 2019—(IN) Office Action—Application No. 201727043994.
Dec. 12, 2019—U.S. Non-Final Office Action—U.S. Appl. No. 15/827,860.
Nov. 26, 2019 U.S. Notice of Allowance—U.S. Appl. No. 15/166,638.
Dec. 11, 2019 U.S. Non-Final Office Action—U.S. Appl. No. 16/102,089.
May 15, 2019 (EP) European Extended Search Report—Application No. 16808098.4.
Doug Newcomb., "Autonomous Cars will Usher in Things We Never Saw Coming," Opinions, PC Magazine Digital Edition, pp. 1-4, (Year 2016).
Harris, Stephen., "Your Questions Answered: Driverless Cars," The Engineer (Online) Feb. 17, 2014: n/a. ProQuest. Web. Jan. 18, 2019 (Year: 2014).
Jan. 31, 2020—U.S. Final Office Action—U.S. Appl. No. 16/021,593.
Feb. 3, 2020—U.S. Notice of Allowance—U.S. Appl. No. 14/458,744.
Feb. 4, 2020—U.S. Notice of Allowance—U.S. Appl. No. 14/458,764.

(56) References Cited

OTHER PUBLICATIONS

Feb. 6, 2020—U.S. Final Office Action—U.S. Appl. No. 15/974,861.
Feb. 5, 2020—U.S. Notice of Allowance—U.S. Appl. No. 14/458,796.
Feb. 14, 2020—U.S. Final Office Action—U.S. Appl. No. 16/021,678.
Feb. 26, 2020—U.S. Notice of Allowance—U.S. Appl. No. 15/206,521.
Mar. 19, 2020—U.S. Non-Final Office Action—U.S. Appl. No. 16/294,103.

* cited by examiner

DETERMINING A DRIVER SCORE BASED ON THE DRIVER'S RESPONSE TO AUTONOMOUS FEATURES OF A VEHICLE

CROSS REFERENCE TO RELATED APPLICATIONS

This application is a continuation-in-part of pending U.S. patent application Ser. No. 14/184,272 entitled "Insurance System for Analysis of Autonomous Driving" and filed on Feb. 19, 2014, which is hereby incorporated by reference in its entirety.

TECHNICAL FIELD

Aspects of the disclosure generally relate to the analysis of vehicle driving data of vehicles that have engaged autonomous driving features for the purposes of determining aspects of vehicle insurance, and for teaching driving skills to drivers of autonomous vehicles.

BACKGROUND

Many vehicles include sensors and internal computer systems designed to monitor and control vehicle operations, driving conditions, and driving functions. Advanced vehicles systems can perform such tasks as detecting and correcting a loss of traction on an icy road, self-parking, or detecting an imminent collision or unsafe driving condition and automatically making evasive maneuvers. Additionally, vehicles can include autonomous driving systems that assume all or part of real-time driving functions to operate the vehicle without real-time input from a human operator.

Many vehicles also include communication systems designed to send and receive information from inside or outside the vehicle. Such information can include, for example, vehicle operational data, driving conditions, and communications from other vehicles or systems. For example, a Bluetooth system may enable communication between the vehicle and the driver's mobile phone. Telematics systems may be configured to access vehicle computers and sensor data, including on-board diagnostics systems (OBD), and transmit the data to a display within the vehicle, a personal computer or mobile device, or to a centralized data processing system. Additionally, vehicle-to-vehicle (V2V) communication systems can be used to send and receive information from other nearby vehicles. Data obtained from vehicle sensors, Telematics systems, OBD systems, and V2V systems, have been used for a variety of purposes, including maintenance, diagnosis, and analysis.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, and computing devices for determining, by a computing device, a property of an insurance policy for a semi-autonomous vehicle. The property of the insurance policy may comprise at least one of a premium, a deductible, a coverage term, and a coverage amount. The property of the insurance policy may be based at least on a driver-independent variable of the semi-autonomous vehicle and a driver-dependent variable. The driver-independent variable of the semi-autonomous vehicle may comprise a Vehicle Identification Number (VIN). The driver-dependent variable may comprise an age of a driver of the semi-autonomous vehicle or a location of residence of the driver of the semi-autonomous vehicle. In some aspects, the property of the insurance policy may be based on a plurality of driver-independent variables including the driver-independent variable and a plurality of driver-dependent variables including the driver-dependent variable.

In response to a determination that a level of autonomy of the semi-autonomous vehicle has changed, a value of the property of the insurance policy may be changed. Changing the value of the property of the insurance policy may comprise determining that the level of autonomy of the semi-autonomous vehicle has increased, and increasing a weight for the driver-independent variable of the semi-autonomous vehicle or decreasing a weight for the driver-dependent variable. Changing the value of the property may also comprise determining the value of the property of the insurance policy based on at least one of the increased weight for the driver-independent variable of the semi-autonomous vehicle and the decreased weight for the driver-dependent variable.

Changing the value of the property of the insurance policy may comprise determining that the level of autonomy of the semi-autonomous vehicle has decreased, and decreasing a weight for the driver-independent variable of the semi-autonomous vehicle or increasing a weight for the driver-dependent variable. Changing the value of the property may also comprise determining the value of the property of the insurance policy based on at least one of the decreased weight for the driver-independent variable of the semi-autonomous vehicle and the increased weight for the driver-dependent variable.

In some aspects, systems, methods, and computing devices may determine that a classification of the vehicle has changed from semi-autonomous to completely autonomous. In response to determining that the classification of the vehicle has changed from semi-autonomous to completely autonomous, the value of the property of the insurance policy may be changed based on the driver-independent variable and not the driver-dependent variable.

Systems, methods, and computing devices described herein may also retrieve, from a database, a vehicle identifier of a semi-autonomous or completely autonomous vehicle, and determine a property of an insurance policy for the semi-autonomous or completely autonomous vehicle. As previously discussed, the property of the insurance policy may comprise at least one of a premium, a deductible, a coverage term, and a coverage amount. The property of the insurance policy may be based on the vehicle identifier of the semi-autonomous or completely autonomous vehicle. The property of the insurance policy might not be based on any driver-dependent variables. As previously discussed, the vehicle identifier may comprise a VIN. Additionally or alternatively, the property of the insurance policy may be based on a plurality of driver-independent variables including the vehicle identifier.

Aspects of the disclosure relate to systems, methods, and computing devices for determining, by a computing device, data identifying vehicles within a predetermined distance of a first vehicle. The predetermined distance of the first vehicle may comprise a predetermined distance of the first vehicle along a path of the first vehicle.

The systems, methods, and computing devices may determine a density of vehicles within the predetermined distance of the first vehicle based on the determined data identifying the vehicles. Determining the density of vehicles within the predetermined distance of the first vehicle may comprise determining a density of completely autonomous vehicles within the predetermined distance of the first vehicle. A property of an insurance policy for the first vehicle may be generated based on the determined density of vehicles. Additionally or alternatively, determining the density of vehicles within the predetermined distance of the first vehicle may comprise determining a density of completely autonomous vehicles within the predetermined distance of the first vehicle and a density of semi-autonomous vehicles within the predetermined distance of the first vehicle. Additionally or alternatively, determining the density of vehicles within the predetermined distance of the first vehicle may comprise determining a density of completely autonomous vehicles within the predetermined distance of the first vehicle, a density of semi-autonomous vehicles within the predetermined distance of the first vehicle, and a density of non-autonomous vehicles within the predetermined distance of the first vehicle.

The systems, methods, and computing devices may sense, using a plurality of sensors on the first vehicle, a number of the vehicles within the predetermined distance of the first vehicle. The plurality of sensors may comprise at least two of the following: a camera, a proximity sensor, a vehicle-to-vehicle communication device, and a vehicle-to-infrastructure communication device. In some aspects, determining the data identifying vehicles within the predetermined distance of the first vehicle may comprise generating the data based on the sensed number of vehicles.

The systems, methods, and computing devices may send, by the computing device, the data identifying vehicles within the predetermined distance of the first vehicle to a remote driving analysis computing device. The remote driving analysis computing device may be configured to generate the property of the insurance policy for the first vehicle.

The systems described herein may comprise a first vehicle having a vehicle computing device. The first vehicle computing device may include a first processor and first memory storing computer-executable instructions that, when executed by the first processor, cause the vehicle computing device to generate data identifying vehicles within a predetermined distance of the first vehicle. The systems may also comprise a driving analysis computing device having a second processor and second memory storing computer-executable instructions that, when executed by the second processor, cause the driving analysis computing device to determine a density of vehicles within the predetermined distance of the first vehicle based on the generated data and generate a property of an insurance policy for the first vehicle based on the determined density of vehicles.

The first memory described herein may store computer-executable instructions that, when executed by the first processor, cause the vehicle computing device to receive, from a plurality of sensors on the first vehicle, a sensed number of vehicles within the predetermined distance of the first vehicle. Generating the data identifying vehicles within the predetermined distance of the first vehicle may comprise generating the data based on the sensed number of vehicles. The plurality of sensors may comprise at least two of the following: a camera, a proximity sensor, a vehicle-to-vehicle communication device, and a vehicle-to-infrastructure communication device. The first memory described herein may also store computer-executable instructions that, when executed by the first processor, cause the vehicle computing device to send the data identifying vehicles within the predetermined distance of the first vehicle to the driving analysis computing device.

Aspects of the disclosure relate to systems, methods, and computing devices for sending an instruction to a vehicle to switch off an autonomous driving feature. A computing device may determine operational data of the vehicle after the autonomous driving feature is switched off. Furthermore, a value of a property of an insurance policy for the vehicle may be determined based on the operational data of the vehicle after the autonomous feature is switched off. As previously discussed, the property of the insurance policy may comprise at least one of a premium, a deductible, a coverage term, and a coverage amount.

In some aspects, the property of the insurance policy may comprise an insurance quote for the vehicle, and determining the value of the property of the insurance policy may comprise determining the value of the insurance quote for the vehicle based on the operational data of the vehicle after the autonomous feature is switched off. The operational data may indicate a driver of the vehicle's response to the autonomous feature being switched off.

Determining the value of the property of the insurance policy for the vehicle may be based on the operational data of the vehicle after the autonomous feature is switched off and a maintenance history for the vehicle. Furthermore, the maintenance history may comprise at least one of a software upgrade to a computing device of the vehicle and a response to an illegal access to software of the computing device.

Determining the value of the property may be based on other information. For example, determining the value of the property of the insurance policy for the vehicle may be based on the operational data of the vehicle after the autonomous feature is switched off and use of an autonomous vehicle lane. Determining the value of the property of the insurance policy for the vehicle may additionally or alternatively be based on the operational data of the vehicle after the autonomous feature is switched off and use of an autonomous parallel parking feature of the vehicle. Determining the operational data of the vehicle after the autonomous driving feature is switched off may comprise determining a history of a driver of the vehicle's response to the autonomous driving feature being switched off over a period of time.

A system for performing the above-described steps is described herein. For example, a system may comprise a vehicle computing device and a driving analysis computing device. The driving analysis computing device may include a processor and memory storing computer-executable instructions that, when executed by the processor, cause the driving analysis computing device to send an instruction to the vehicle computing device of a vehicle to switch off an autonomous driving feature. The driving analysis computing device may also determine operational data of the vehicle after the autonomous driving feature is switched off, and determine a value of a property of an insurance policy for the vehicle based on the operational data of the vehicle after the autonomous feature is switched off. The system may perform additional steps as previously discussed and as described herein.

Aspects of the disclosure relate to systems, methods, and computing devices for switching off an autonomous feature of a vehicle in response to a determination that an environmental condition of the vehicle is satisfied. The determination that the environmental condition of the vehicle is satisfied may comprise determining that a density of vehicles within a predetermined distance of the vehicle is below a threshold. In some examples, prior to switching off the autonomous feature of the vehicle, the method may include determining that the driver of the vehicle has enabled a teaching feature of the vehicle. The determination that the environmental condition of the vehicle is satisfied may be performed at a first time, and the method may further comprise switching on the autonomous feature of the vehicle in response to a determination that the environmental condition of the vehicle is not satisfied at a second time after the first time.

A computing device may determine operational data of the vehicle after the autonomous feature of the vehicle is switched off, and the operational data of the vehicle may indicate a driver of the vehicle's response to the autonomous feature of the vehicle being switched off. A score based on the operational data of the vehicle after the autonomous feature is switched off may be generated. If the score exceeds a threshold, a reward may be provided to the driver of the vehicle. If the score does not exceed a threshold, a recommended response for the driver of the vehicle may be generated. The recommended response may be provided to the driver of the vehicle while the driver is in the vehicle. In some aspects, a value of a property of an insurance policy for the vehicle may be determined based on the generated score.

A system for performing the above-described steps is described herein. For example, the system may comprise a vehicle having a vehicle computing device, the vehicle computing device including a first processor and first memory storing computer-executable instructions that, when executed by the first processor, cause the vehicle computing device to switch off an autonomous feature of a vehicle in response to a determination that an environmental condition of the vehicle is satisfied. The vehicle computing device may also determine operational data of the vehicle after the autonomous feature of the vehicle is switched off, the operational data of the vehicle indicating a driver of the vehicle's response to the autonomous feature of the vehicle being switched off. The system may also comprise a driving analysis computing device having a second processor and second memory storing computer-executable instructions that, when executed by the second processor, cause the driving analysis computing device to generate a score based on the operational data of the vehicle after the autonomous feature is switched off. The system may perform additional steps as previously discussed and as described herein.

The systems described herein may include a vehicle computing device and a driving analysis computing device. The driving analysis computing device may comprise a processor and memory storing computer-executable instructions that, when executed by the processor, cause the driving analysis computing device to perform the steps described herein. Additionally or alternatively, a non-transitory computer readable medium storing instructions that, when read by a computing device, may cause the computing device to perform the steps described herein.

Aspects of the present disclosure improve determination of properties of insurance policies for vehicles that engage in autonomous driving and improve drivers' skills by teaching them driving techniques. Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
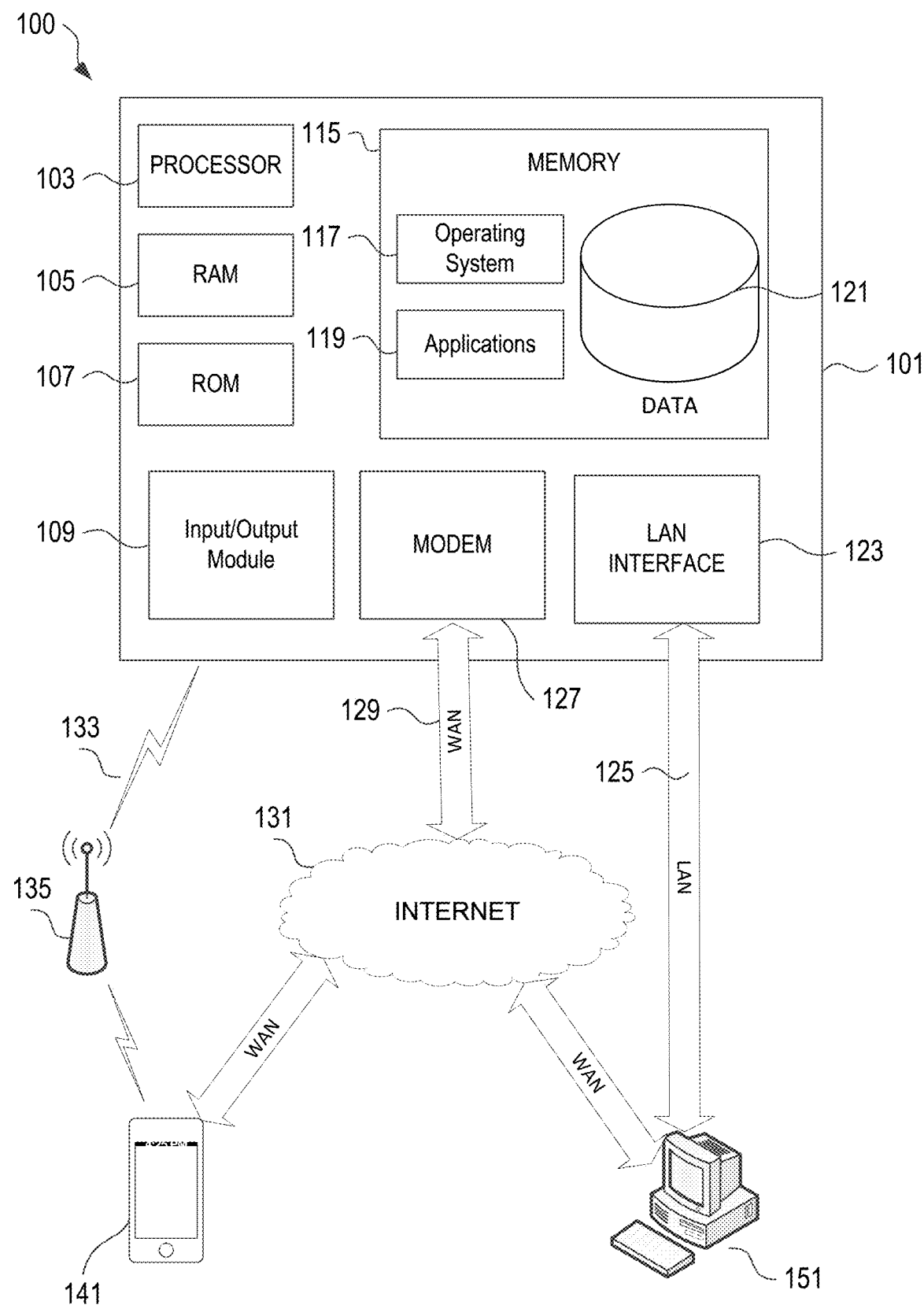
FIG. 1 illustrates a network environment and computing systems that may be used to implement aspects of the disclosure.

FIG. 1 illustrates a block diagram of a computing device 101 in driving analysis communication system 100 that may be used according to one or more illustrative embodiments of the disclosure. The driving analysis computing device 101 may have a processor 103 for controlling overall operation of the computing device 101 and its associated components, including RAM 105, ROM 107, input/output module 109, and memory unit 115. The computing device 101, along with one or more additional devices (e.g., terminals 141, 151) may correspond to any of multiple systems or devices, such as a driving analysis computing devices or systems, configured as described herein for transmitting and receiving vehicle operational data, analyzing vehicle operational data, determining aspects related to vehicle insurance rating factors, including distance-based autonomous driving insurance rating factors, and determining properties of vehicle insurance policies. Vehicle operational data can include data collected from vehicle sensors and OBD systems. Vehicle operations can also include data pertaining to the driver of a vehicle. Vehicle operational data can also include data pertaining to other nearby vehicles collected via, for example, V2V communications. As used herein, vehicle operation data is used interchangeably with driving data.

The computing device 101 may additionally or alternatively be configured to generate vehicle insurance rates based on driver-independent variables and/or driver-dependent variables, generate vehicle insurance rates based on changes in the level of autonomy of vehicles according to one or more aspects of the disclosure, track vehicle density and/or generate vehicle insurance rates based on vehicle density, analyze use of autonomous vehicle features and/or maintenance of autonomous vehicles, and enable vehicle teaching features and/or monitor the driver's response to teaching features, as will be described in further detail in the examples below.

Input/Output (I/O) 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the driving analysis system 101 to execute a series of computer-readable instructions to transmit or receive vehicle driving data, analyze driving data, determine driving characteristics from the driving data, and determine properties of, for example, vehicle insurance policies using the driving data.

The driving analysis computing device 101 may operate in a networked environment 100 supporting connections to one or more remote computers, such as terminals/devices 141 and 151. Driving analysis computing device 101, and related terminals/devices 141 and 151, may include devices installed in vehicles, mobile devices that may travel within vehicles, or devices outside of vehicles that are configured to receive and process vehicle and driving data. Thus, the driving analysis computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the driving analysis computing device 101. The network connections depicted in FIG. 1 include a local area network (LAN) 125 and a wide area network (WAN) 129, and a wireless telecommunications network 133, but may also include other networks. When used in a LAN networking environment, the driving analysis computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis computing device 101 may include computer executable instructions (e.g., driving data analysis programs, driving characteristic algorithms, driving and insurance policy properties algorithms, vehicle insurance rating factor algorithms, driver reward algorithms, and driver teaching algorithms) for transmitting and receiving vehicle driving data, determining mileage units indicating distances traveled by the vehicle while the vehicle was engaged in autonomous driving, determining distance-based autonomous driving insurance rating factors, determining various properties associated with one or more vehicle insurance policies, and performing other related functions as described herein.

Vehicle operational data may refer to information pertaining to one or more actions or events performed by a vehicle and can include aspects of information identified or determined from data collected from a vehicle. Vehicle operational data can include, for example, a vehicle speed and/or gas mileage. In addition, for example, vehicle operational data may include an indication that the vehicle is engaged in autonomous or manual driving, a road condition, a road-type and other operational data collected from the vehicle.

Vehicle operational data may also include data describing the environment surrounding the vehicle, such as a vehicle density and type of vehicles near the tracked vehicle (e.g., whether the vehicles surrounding the tracked vehicle are autonomous or not). Vehicle operational data may also include the driver's use of autonomous vehicle features, the driver's maintenance of the vehicle, and/or the driver's use of and response to autonomous driving (e.g., teaching) features.

As discussed below, a mileage unit indicating a distance traveled by the vehicle when the vehicle has engaged in autonomous driving can be determined from driving data collected by a vehicle sensors and telematics device, and/or additional data received from other nearby vehicles using vehicle-to-vehicle (V2V) communications. It should be understood that vehicle operational data may be associated with a vehicle, a driver, or a group of vehicles or drivers engaged in social interaction, such as an autonomous droning relationship.

A vehicle insurance rating factor may refer to a factor which reflects a relative level of risk associated with aspects of vehicle insurance. The vehicle insurance rating factor can be based on or more data points and be used to determine a property of a vehicle insurance policy. A property of a vehicle insurance policy can include, for example, a premium, a deductible, a coverage term, and a coverage amount. An example vehicle insurance rating factor of the instant disclosure includes a distance-based autonomous driving insurance rating factor. As used herein, a distance-based autonomous driving insurance rating factor is used synonymously with distance-based autonomous driving insurance factor. Other exemplary rating factors include, but are not limited to, the driver's response when switching between autonomous and manual driving features (or mode), the vehicle's maintenance history, the use of manual or automated vehicle lanes, and the use of autonomous parallel parking.

Figure 2:
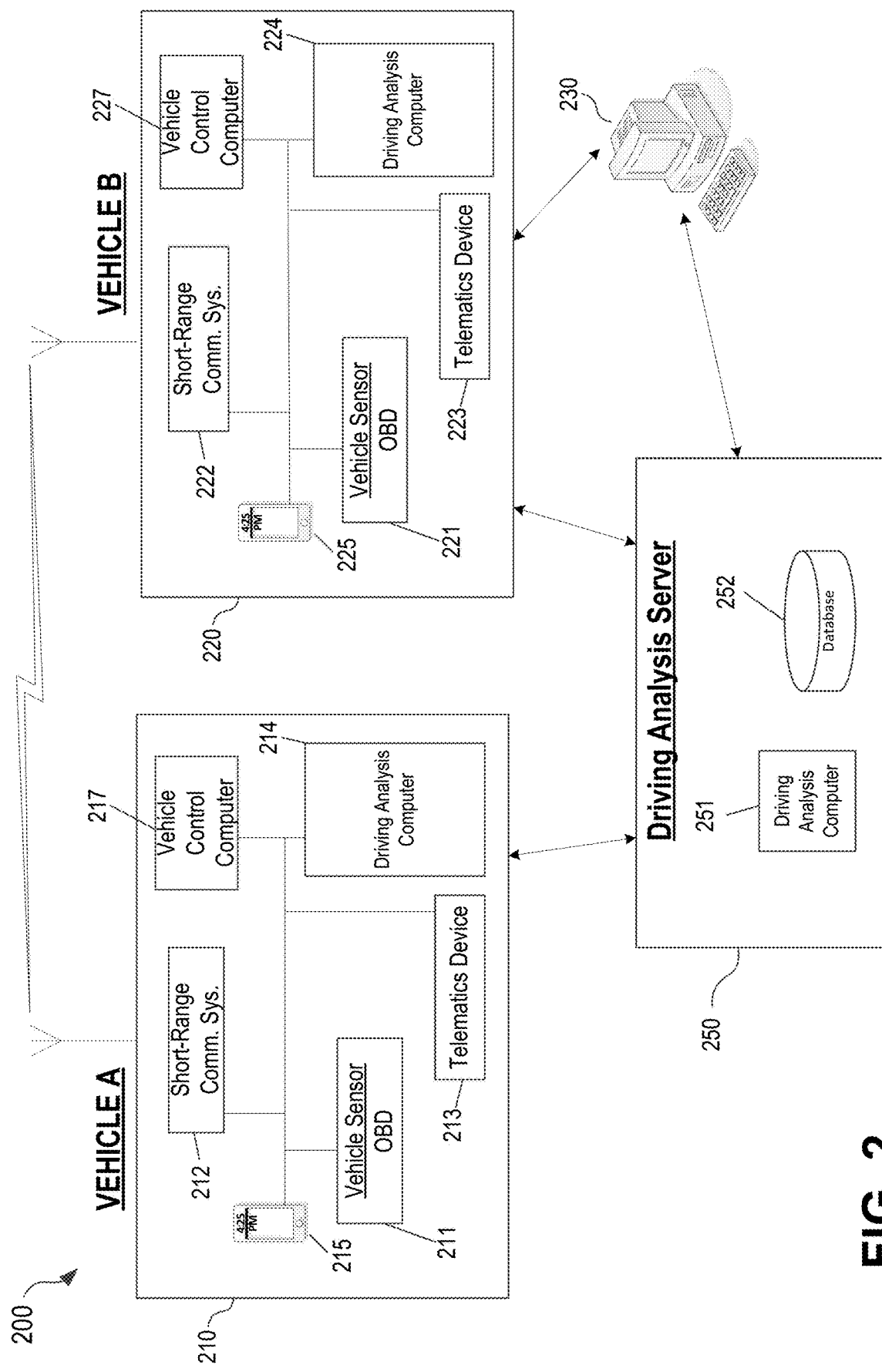
FIG. 2 is a diagram illustrating various example components of a driving analysis computing device according to one or more aspects of the disclosure.

FIG. 2 is a diagram of an illustrative driving analysis system 200 including two vehicles 210 and 220, a driving analysis server 250, and additional related components. Each component shown in FIG. 2 may be implemented in hardware, software, or a combination of the two. Additionally, each component of the driving analysis system 200 may include a computing device (or system) having some or all of the structural components described above for computing device 101.

Vehicles 210 and 220 in the driving analysis system 200 may be, for example, automobiles, motorcycles, scooters, buses, recreational vehicles, boats, or other vehicles for which a vehicle driving data may be collected and analyzed. The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 211 and 221 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle OBD.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, vehicle spacing, traffic levels, road conditions, traffic obstructions, animals, cyclists, pedestrians, and other conditions that may factor into a driving data analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), software upgrades, and/or tire pressure.

Vehicles sensors 211 and 221 also may include cameras and/or proximity sensors capable of recording additional conditions inside or outside of the vehicles 210 and 220. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensors 211 and 221 also may be configured to collect data a driver's movements or the condition of a driver. For example, vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 211 and 221 also may collect information regarding the driver's route choice, whether the driver follows a given route, and to classify the type of trip (e.g. commute, errand, new route, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used to determine the route, lane position, road-type (e.g. highway, entrance/exit ramp, residential area, etc.) and other vehicle position/location data.

The data collected by vehicle sensors 211 and 221 may be stored and/or analyzed within the respective vehicles 210 and 220, such as for example a driving analysis computer 214, 224 integrated into the vehicle, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as driving analysis server 250.

Short-range communication systems 212 and 222 are vehicle-based data transmission systems configured to transmit vehicle operational data to other nearby vehicles, and to receive vehicle operational data from other nearby vehicles. In some examples, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device 101 in one vehicle to determine that another vehicle is tailgating or cut-off the vehicle, whereas longer communications may allow the device 101 to determine additional types of driving behaviors (e.g., vehicle spacing, yielding, defensive avoidance, proper response to a safety hazard, etc.) and driving conditions (e.g., congestion).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

The types of vehicle operational data, or vehicle driving data, transmitted by vehicles 210 and 220 may depend on the protocols and standards used for the V2V communication, the range of communications, the autonomous driving system, and other factors. In certain examples, vehicles 210 and 220 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as detection by the vehicle's 210 internal systems that the vehicle is skidding, that an impact has occurred, or that the vehicle's airbags have been deployed, also may be transmitted in V2V communications. In various other examples, any data collected by any vehicle sensors 211 and 221 potentially may be transmitted via V2V communication to other nearby vehicles or infrastructure devices receiving V2V communications from communication systems 212 and 222. Further, additional vehicle driving data not from the vehicle's sensors (e.g., vehicle make/model/year information, driver insurance information, driver scores, etc.) may be collected from other data sources, such as a driver's or passenger's mobile device 215 or 225, driving analysis server 250, and/or another external computer system 230, and transmitted using V2V communications to nearby vehicles and other transmitting and receiving devices using communication systems 212 and 222.

As shown in FIG. 2, the data collected by vehicle sensors 211 and 221 also may be transmitted to a driving analysis server 250, and one or more additional external servers and devices via telematics devices 213 and 223. Telematics devices 213 and 223 may be computing devices containing many or all of the hardware/software components as the computing device 101 depicted in FIG. 1. As discussed above, the telematics devices 213 and 223 may receive vehicle operation data and driving data from vehicle sensors 211 and 221, and may transmit the data to one or more external computer systems (e.g., driving analysis server 250 of an insurance company, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221 or system, such as an autonomous driving system. The telematics devices 213 and 223 also may store the type of their respective vehicles 210 and 220, for example, the make, model, trim (or sub-model), year, and/or engine specifications, autonomous driving system specifications, as well as other information such as vehicle owner or driver information, insurance information, and financing information for the vehicles 210 and 220.

In the example shown in FIG. 2, telematics devices 213 and 223 may receive vehicle driving data from vehicle sensors 211 and 221, and may transmit the data to a driving analysis server 250. However, in other examples, one or more of the vehicle sensors 211 and 221 or systems, including autonomous driving systems, may be configured to receive and transmit data directly from or to a driving analysis server 250 without using a telematics device. For instance, telematics devices 213 and 223 may be configured to receive and transmit data from certain vehicle sensors 211 and 221 or systems, while other sensors or systems may be configured to directly receive and/or transmit data to a driving analysis server 250 without using the telematics devices 213 and 223. Thus, telematics devices 213 and 223 may be optional in certain embodiments.

In certain embodiments, vehicle sensors, vehicle OBD, autonomous driving systems, and/or vehicle communication systems, may collect and/or transmit data pertaining to autonomous driving of the vehicles. In autonomous driving, the vehicle fulfills all or part of the driving without being piloted by a human. An autonomous car can be also referred to as a driverless car, self-driving car, or robot car. For example, in autonomous driving, a vehicle control computer 217, 227 may be configured to operate all or some aspects of the vehicle driving, including but not limited to acceleration, braking, steering, and/or route navigation. A vehicle with an autonomous driving capability may sense its surroundings using the vehicle sensors 221, 221 and/or receive inputs regarding control of the vehicle from the vehicle communications systems, including but not limited to short range communication systems 212, 222, Telematics 213, 223, or other vehicle communication systems.

In certain embodiments, mobile computing devices 215 and 225 within the vehicles 210 and 220 may be used to collect vehicle driving data and/or to receive vehicle driving data from vehicle communication systems and then to transmit the vehicle driving data to the driving analysis server 250 and other external computing devices. Mobile computing devices 215 and 225 may be, for example, mobile phones, personal digital assistants (PDAs), or tablet computers of the drivers or passengers of vehicles 210, 220. Software applications executing on mobile devices 215, 225 may be configured to detect certain driving data independently and/or may communicate with vehicle sensors 211, 221, Telematics 213, 223, autonomous driving systems, or other vehicle communication systems to receive additional driving data. For example, mobile devices 215, 225 equipped with GPS functionality may determine vehicle location, speed, direction and other basic driving data without needing to communicate with the vehicle sensors 211 or 221, or any vehicle system. In other examples, software on the mobile devices 215, 225 may be configured to receive some or all of the driving data collected by vehicle sensors 211, 221. Mobile computing devices 215 and 225 may also be involved with aspects of autonomous driving, including receiving, collecting, and transmitting vehicle operational data regarding autonomous driving and autonomous driving relationships between multiple vehicles.

When mobile computing devices 215 and 225 within the vehicles 210 and 220 are used to detect vehicle driving data and/or to receive vehicle driving data from vehicles 211 and 221, the mobile computing devices 215 and 225 may store, analyze, and/or transmit the vehicle driving data to one or more other devices. For example, mobile computing devices 215 and 225 may transmit vehicle driving data directly to one or more driving analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle driving data to and from other nearby vehicles. Thus, mobile computing devices 215 and 225 may be used in conjunction with, or instead of, short-range communication systems 212 and 222 in some examples. In addition, mobile computing devices 215 and 225 may be used in conjunction with the vehicle control computers 217 and 227 for purposes of autonomous driving. Moreover, the processing components of the mobile computing devices 215 and 225 may be used to analyze vehicle driving data, determine a distance-based autonomous driving insurance factor, determine properties related to aspects of a vehicle insurance policy, and perform other related functions. Therefore, in certain embodiments, mobile computing devices 215 and 225 may be used in conjunction with, or in place of, the driving analysis computers 214 and 224.

Vehicles 210 and 220 may include driving analysis computers 214 and 224, which may be separate computing devices or may be integrated into one or more other components within the vehicles 210 and 220, such as the short-range communication systems 212 and 222, telematics devices 213 and 223, autonomous driving systems, or the internal computing systems of vehicles 210 and 220. As discussed above, driving analysis computers 214 and 224 also may be implemented by computing devices independent from the vehicles 210 and 220, such as mobile computing devices 215 and 225 of the drivers or passengers, or one or more separate computer systems 230 (e.g., a user's home or office computer). In any of these examples, the driving analysis computers 214 and 224 may contain some or all of the hardware/software components as the computing device 101 depicted in FIG. 1. Further, in certain implementations, the functionality of the driving analysis computers, such as storing and analyzing vehicle driving data, determining a distance-based autonomous driving insurance factor, and determining aspects of insurance policies, may be performed in a central driving analysis server 250 rather than by individual vehicles 210 and 220. In such implementations, the vehicles 210 and 220 might only collect and transmit vehicle driving data to a driving analysis server 250, and thus the vehicle-based driving analysis computers 214 and 224 may be optional.

Driving analysis computers 214 and 224 may be implemented in hardware and/or software configured to receive vehicle driving data from vehicle sensors 211 and 221, short-range communication systems 212 and 222, telematics devices 213 and 223, vehicle control computer 217 and 227, autonomous driving systems, and/or other driving data sources. Vehicle sensors/OBDs 211 and 221, short-range communication systems 212 and 222, telematics devices 213 and 223, vehicle control computer 217 and 227, autonomous driving systems, and/or other driving data sources can be referred to herein individually or collectively as a vehicle data acquiring component. The driving analysis computer 214, 224 may comprise an electronic receiver to interface with the vehicle data acquiring components to receive the collected data. After receiving, via the electronic receiver, the vehicle driving data from, for example, a vehicle data acquiring component, the driving analysis computers 214 and 224 may perform a set of functions to analyze the driving data and determine properties related to vehicle insurance.

For example, the driving analysis computers 214 and 224 may include one or more distance-based autonomous driving insurance factor algorithms, which may be executed by software running on generic or specialized hardware within the driving analysis computers. The driving analysis computer 214 in a first vehicle 210 may use the vehicle driving data received from that vehicle's sensors 211, along with vehicle driving data for other nearby vehicles received via the short-range communication system 212, to determine a distance-based autonomous driving insurance factor and determine properties related to vehicle insurance applicable to the first vehicle 210 and the other nearby vehicles. Within the driving analysis computer 214, a vehicle insurance property function may use the results of the driving analysis performed by the computer 214 to determine/adjust a property of an insurance policy associated with the vehicle 210 and/or a driver of a vehicle 210. Further descriptions and examples of the algorithms, functions, and analyses that may be executed by the driving analysis computers 214 and 224 are described below, including in reference to FIGS. 3, 4, and 5.

As another example, the driving analysis computers 214 and 224 may include one or more algorithms configured to generate vehicle insurance rates based on driver-independent variables and/or driver-dependent variables, generate vehicle insurance rates based on changes in the level of autonomy of vehicles according to one or more aspects of the disclosure, track vehicle density and/or generate vehicle insurance rates based on vehicle density, analyze use of autonomous vehicle features and/or maintenance of autonomous vehicles, and enable vehicle teaching features and/or monitor the driver's response to teaching features, as will be described in further detail in the examples below.

The system 200 also may include a driving analysis server 250, containing some or all of the hardware/software components as the computing device 101 depicted in FIG. 1. The driving analysis server 250 may include hardware, software, and network components to receive vehicle operational data/driving data from one or more vehicles 210 and 220, and other data sources. The driving analysis server 250 may include a driving data and driver data database 252 and driving analysis computer 251 to respectively store and analyze driving data received from vehicles and other data sources. The driving analysis server 250 may initiate communication with and/or retrieve driving data from vehicles 210 and 220 wirelessly via telematics devices 213 and 223, mobile devices 215 and 225, or by way of separate computing systems (e.g., computer 230) over one or more computer networks (e.g., the Internet). Additionally, the driving analysis server 250 may receive additional data from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the driving data database 252 may be organized in any of several different manners. For example, a table in database 252 may contain all of the vehicle operation data for a specific vehicle 210, similar to a vehicle event log. Other tables in the database 252 may store certain types of data for multiple vehicles. For instance, tables may store specific data sets, including data types discussed above (e.g. road-type information, insurance data, etc.).

The driving analysis computer 251 within the driving analysis server 250 may be configured to retrieve data from the database 252, or may receive driving data directly from vehicles 210 and 220 or other data sources, and may perform driving data analyses, determine distance-based autonomous driving insurance factor, and/or vehicle insurance determinations, and other related functions. The functions performed by the driving analysis computer 251 may be similar to those of driving analysis computers 214 and 224, and further descriptions and examples of the algorithms, functions, and analyses that may be executed by the driving analysis computer 251 are described below, including in reference to FIGS. 3 through 10.

In various examples, the driving data analyses, mileage unit determinations, and/or insurance property determinations may be performed entirely in the driving analysis computer 251 of the driving analysis server 250 (in which case driving analysis computers 214 and 224 need not be implemented in vehicles 210 and 220), or may be performed entirely in the vehicle-based driving analysis computers 214 and 224 (in which case the driving analysis computer 251 and/or the driving analysis server 250 need not be implemented). In other examples, certain driving data analyses may be performed by vehicle-based driving analysis computers 214 and 224, while other driving data analyses are performed by the driving analysis computer 251 at the driving analysis server 250. For example, a vehicle-based driving analysis computer 214 may continuously receive and analyze driving data from nearby vehicles to determine certain driving characteristics (e.g., mileage units of distance traveled by the vehicle when the vehicle is engaged in autonomous driving or other data as described herein) so that large amounts of driving data need not be transmitted to the driving analysis server 250. However, for example, after a mileage unit is determined by the vehicle-based driving analysis computer 214, the information may be transmitted to the server 250, and the driving analysis computer 251 may determine if a property of the insurance policy should be updated.

Figure 3:
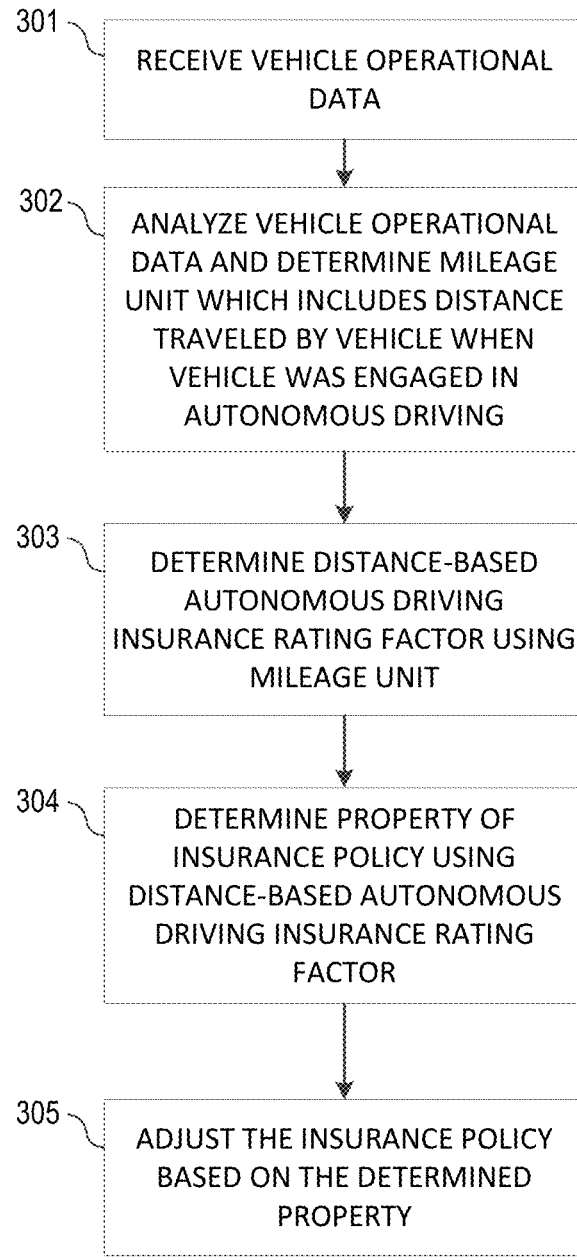
FIG. 3 is a flow diagram illustrating an example method of analyzing vehicle driving data according to one or more aspects of the disclosure.
Figure 4:
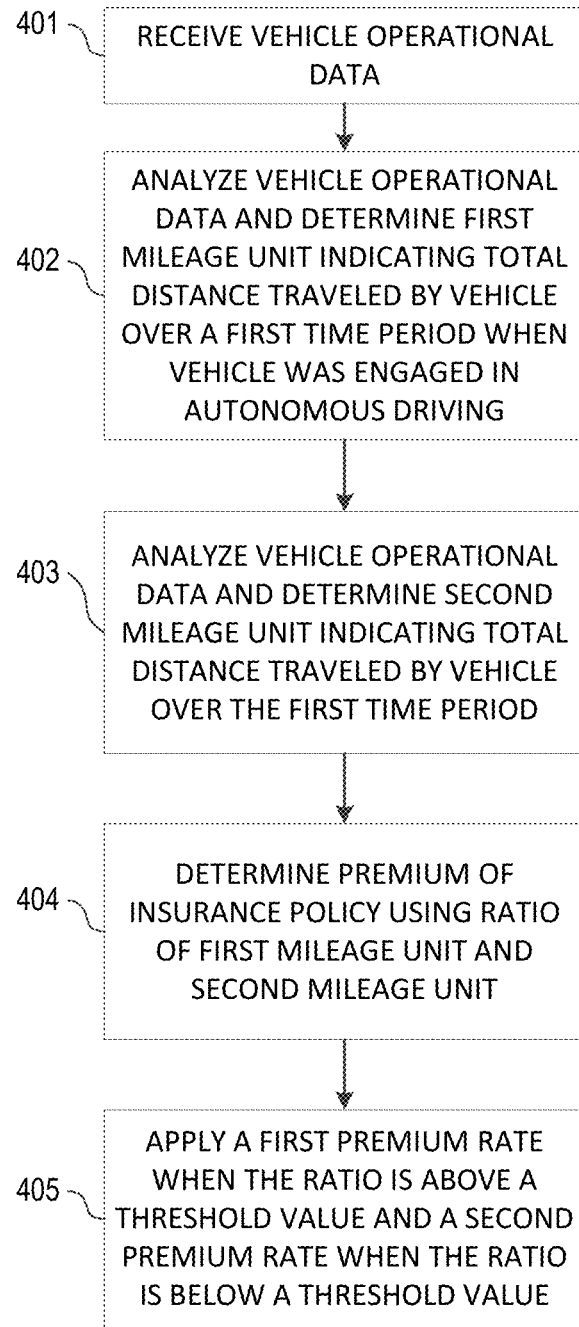
FIG. 4 is a flow diagram illustrating an example method of analyzing vehicle driving data according to one or more aspects of the disclosure.

FIG. 3 and FIG. 4 are flow diagrams illustrating example methods of determining a property of an insurance policy based on analysis of vehicle operational data of vehicles engaged in autonomous driving. FIG. 3 includes an example step of determining a distance-based autonomous driving insurance rating factor. The examples of FIG. 3 and FIG. 4 may be performed by one or more computing devices in a driving analysis system, such as vehicle-based driving analysis computers 214 and 224, a driving analysis computer 251 of a driving analysis server 250, user mobile computing devices 215 and 225, and/or other computer systems.

The steps shown in FIG. 3 describe performing an analysis of vehicle operational data to determine a distance-based autonomous driving insurance rating factor of vehicles engaged in an autonomous driving and determining a property of an insurance policy based on the factor. In step 301, vehicle operational data may be received from a first vehicle 210. As described above, a driving analysis computer 214 may receive and store vehicle driving data from a vehicle data acquiring component, including but not limited to the vehicle's internal computer systems and any combination of the vehicle's sensors/OBD 211 and/or communication systems. The data received in step 301 may include, for example, an identifier that the vehicle is engaged in autonomous driving. The data received in step 301 may include, for example, the location, speed, direction of travel, distance traveled, distance traveled while engaged in autonomous driving, object proximity data from the vehicle's external cameras and proximity sensors, and data from the vehicle's various systems used to determine if the vehicle 210 is braking, accelerating, or turning, etc., and status of the vehicle's user-operated controls (e.g., head lights, turn signals, hazard lights, radio, phone, etc.), along with any other data collected by vehicle sensors/OBD 211 or data received from a nearby vehicle.

In step 302, the vehicle operational data is analyzed to determine one or more mileage units. As used herein, a mileage unit indicates a distance traveled by the vehicle when the vehicle was engaged in autonomous driving for at least a portion of the distance traveled. For example, in an embodiment, a first mileage unit can indicate a total distance traveled by the vehicle when the vehicle was engaged in autonomous driving over a period of time. In addition, for example, a second mileage unit can indicate a total distance traveled by the vehicle over the same period of time as the first mileage unit. In such examples, the first mileage unit would be equal to the second mileage unit if the vehicle was engaged in autonomous driving over the entire distance driven over period of time. Or, the first mileage unit would be less than the second mileage unit if the vehicle was engaged in autonomous driving for only a portion of the distance driven over the period of time.

The driving analysis computer may determine a mileage unit from the vehicle operational data in multiple ways. The manner in which a mileage unit is determined may depend on the type of information included in the driving data. For example, the driving data may include an identifier which indicates that the vehicle is engaged in autonomous driving and information indicating distance traveled by the vehicle. Information indicating distance traveled may be obtained from, for example, the vehicle odometer, trip meter, and/or other distance measuring device of the vehicle. In addition, distance traveled information can be determined from other driving data including, for example, time and speed information and/or location information, such as GPS. Example algorithms using time marked driving data are included in US Publications Number 2013/0073112 which is hereby incorporated by reference herein in its entirety. In addition, mileage units can be determined to indicate a distance traveled by the vehicle over a single trip, multiple trips, a period of time, and/or in an ongoing tally. Mileage units can also be determined from, for example, contiguous or non-contiguous distances traveled by the vehicle. Mileage units can also be determined from, for example, distances traveled when at least one other condition is satisfied during travel, including a distance traveled over a certain road-type, driving during a certain weather condition, and/or driving in a certain location. A period of time can be, for example, a six-month term of an insurance policy associated with the vehicle. In addition, for example, a period of time can be a month, a week, a day, an hour, a second, and/or multiples or combinations of the same.

In an example, the driving analysis computer can determine a mileage unit using an autonomous driving identifier to determine when the vehicle was engaged in autonomous driving and the distance traveled information collected from a distance measuring device of the vehicle to determine any number of various distances traveled by the vehicle when the vehicle was engaged in autonomous driving for at least a portion of the distance traveled. In an example, a mileage unit indicating a total distance traveled by the vehicle when the vehicle was engaged in autonomous driving over a sixth month period of time can be determined by adding all the distance segments traveled within the six-month time period when the autonomous driving indicator indicates that the vehicle was engaged in autonomous driving.

In certain embodiments, a mileage unit can be determined based on driving data additional to a distance traveled by the vehicle when the vehicle was engaged in autonomous driving for at least a portion of the distance traveled. For example, such additional driving data can include, for example, period of time, a road-type (e.g. highway, side road, etc.), road condition, speed, driver data, weather condition, time-of-day, driving event or action, congestion level, location, etc. For example, a first mileage unit can be determined to indicate a total distance traveled by the vehicle over a first road-type when the vehicle was engaged in autonomous driving for at least a portion the distance and a second mileage unit can be determined to indicate a total distance traveled by the vehicle over the first road-type when the vehicle was engaged in autonomous driving. In such example, the first mileage unit indicates total distance traveled over the road-type, and the second mileage unit indicates the amount of such total for which the vehicle was engaged in autonomous driving.

In step 303, the mileage units determined in step 302 may be used to determine a distance-based autonomous driving insurance rating factor. In addition, in an example, in step 303, the mileage units determined in step 302 and additional driving data may be used to determine a distance-based autonomous driving insurance factor. In an embodiment, a mileage unit determined in step 302 and additional driving data are input variables used to determine a distance-based autonomous driving insurance factor. For example, in step 303, the mileage units determined in step 302 and an autonomous driving system quality rating may be used to determine a distance-based autonomous driving insurance factor. In another example, in step 303, the mileage units determined in step 302 and an autonomous driving characteristic or event determined from the driving data can be used to determine a distance-based autonomous driving insurance factor. An autonomous driving characteristic or autonomous driving event can include, for example, actions performed or events undertaken by the vehicle or nearby vehicles—such as that the vehicle was a lead vehicle in an autonomous droning relationship or that the vehicle engaged in self-parking.

In step 304, a property of an insurance policy may be determined using the distance-based autonomous driving insurance rating factor. The property of an insurance policy can include any of a number of aspects of a vehicle insurance policy. For example, a property of an insurance policy can include a premium, a deductible, a coverage term, a coverage amount, or other attribute of an insurance policy. In various embodiments, the property can be determined in accordance with rules set forth by the insurance provider. For example, the property of the vehicle insurance policy may change depending upon any number of driving data points, driver information, and other information. For example, in step 304, a distance-based autonomous driving insurance factor may be determined using one or more mileage units determined in step 303. For example, in step 304, a distance-based autonomous driving insurance factor may be determined using a comparison between one or more mileage units. In an example, in step 304 a comparison between two or mileage units can be a ratio. For example, a ratio can be between a first mileage unit that indicates a total distance traveled by the vehicle when the vehicle was engaged in autonomous driving over the first period of time and a second mileage unit that indicates a total distance traveled by the vehicle over the first period of time. In such example, the ratio can indicate a percentage of the total distance traveled by the vehicle over the first period of time where the vehicle was engaged in autonomous driving. The ratio can be used to determine a property of a vehicle insurance policy. In an example, in step 304, where the property of the vehicle insurance policy is a premium, a first premium rate can be applied when the ratio is above a threshold value and a second premium rate can be applied when the ratio is below the threshold value. In an example, one or more premium rates can be applied on a per-mile basis.

In step 305, the driving analysis computer can adjust or cause to adjust the insurance policy based on the determined property. In various embodiments, the adjustment can occur during the coverage term and/or prior to an initial or subsequent coverage term. In addition, the policy holder may be notified of the adjustment. Alternatively, the adjustment can come in the form of a reward. Examples of using driving data to determine rewards, including driver rewards related to vehicle insurance, are disclosed in U.S. application Ser. No. 14/163,741 which is hereby incorporated by reference herein in its entirety.

Referring to FIG. 4, the steps shown in FIG. 4 describe an example of performing an analysis of vehicle operational data to determine mileage units indicating distances traveled by a vehicle over a period of time when the vehicle was engaged in autonomous driving over at least a portion of the distance traveled. In step 401, vehicle operational data may be received from a first vehicle 201. In step 402, the vehicle operational data is analyzed and a first mileage unit is determined to indicate a total distance traveled by the vehicle when the vehicle was engaged in autonomous driving over a period of time. In step 403, the vehicle operational data is analyzed and a second mileage unit is determined to indicate a total distance traveled by the vehicle over the same period of time as for the first mileage unit. In step 404, a premium of an insurance policy associated with the vehicle is determined using a ratio of the first mileage unit and the second mileage unit. In step 405, a first premium rate is applied when the ratio is above a threshold value and a second premium rate is applied when the ratio is below the threshold value.

Figure 5:
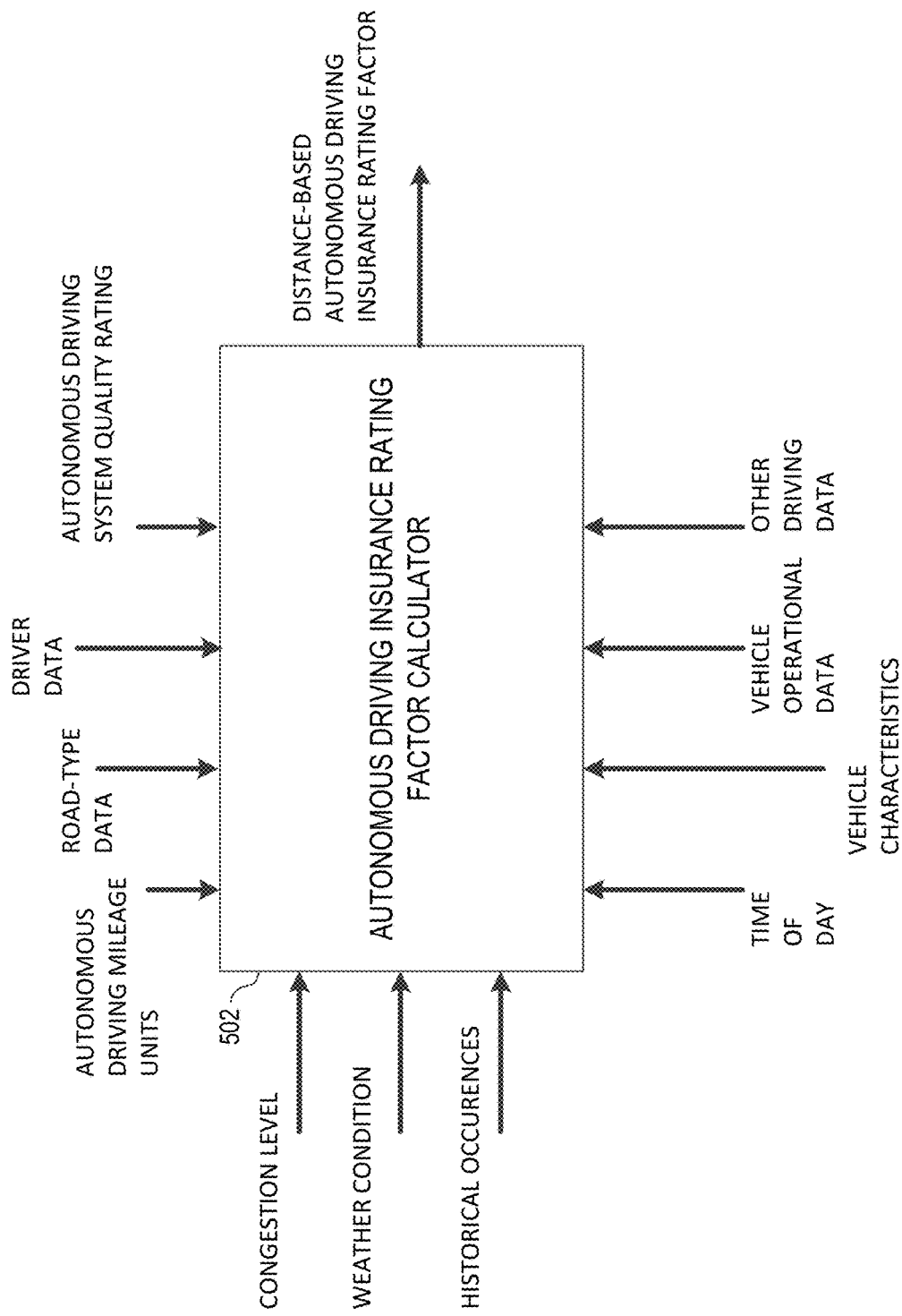
FIG. 5 is a diagram illustrating one example of an autonomous driving insurance rating factor calculator according to one or more aspects of the disclosure.

Referring to FIG. 5, an autonomous driving insurance rating factor calculator 502 may calculate the distance-based autonomous driving insurance rating factor using at least one input variable. In various embodiments, an input variable can include at least one mileage unit or at least one mileage unit and additional driving data. The additional driving data may include, but is not limited to, at least one of: vehicle speed, location, road-type, weather condition, driver score, vehicle's characteristics (e.g., vehicle type-SUV, sports car, sedan, convertible, etc., vehicle's turning radius, vehicle's maximum speed, vehicle time to accelerate from 0-60 mph, and other characteristics tied to the specific vehicle), driving risk characteristics/profile of the driver/operator, and other characteristics.

In an embodiment, an input variable can include an autonomous driving system quality rating. For example, assuming numerous systems exist for autonomous driving, "System A" may use hardware and/or software algorithms different from that of competing "System B." As a result, each of the systems may react differently when used in the real world, and as such, will earn a driving risk characteristic/profile commensurate with the amount of risk associated with the particular system. In an embodiment, an autonomous driving system quality rating may indicate a rating of the likelihood of an autonomous driving system of the vehicle to avoid accidents involving the vehicle. Therefore, an autonomous driving insurance rating factor calculator 402 may take into account different quality rating/level of risk for "System A" than for "System B," in some examples. In another example, the autonomous driving system quality rating may take into account factors such as number of accidents, moving violations, number of submitted insurance claims, and other factors known for a particular autonomous driving system.

In addition, referring to FIG. 4, other information may also be inputted into the autonomous driving rating factor calculator 402 for consideration in calculating a distance-based autonomous driving insurance rating factor or other autonomous driving insurance rating factor. For example, the congestion level (e.g., traffic) on a roadway, the weather conditions the roadway, historical occurrences of incidents (e.g., vehicular accidents) on the roadway, and other factors related to the environment/surroundings in which the vehicle is operated. For example, the autonomous driving insurance rating factor calculator 402 may adjust the factor based on the congestion level on the roadway being high. In one example, the autonomous driving insurance rating factor calculator 402 may determine a factor value which indicates elevated risk during rush hour traffic to encourage vehicles 402 equipped with an autonomous driving system to engage in autonomous driving. Congestion levels may be divided, in one example, into categories of high, medium, and low based on the whether the travel time through a particular roadway falls into the upper ⅓, middle ⅓, or lower ⅓ of possible travels times historically logged on that roadway. Likewise, weather conditions may play a role in determining risk level. For example, in a fog situation, the risk may be relatively higher for manual driving versus autonomous driving. In order to encourage the driver to engage in autonomous driving, the calculator may determine a factor which indicates elevated risk for manual driving and lower risk for autonomous driving. The driving analysis computing device can, for example, determine a deductible amount which is higher for manual driving in the fog than autonomous driving in the fog. The driving analysis computing device can notify the driver of the vehicle of the deductible amount and/or difference in deductible amount to encourage the driver to engage in autonomous driving. The notice can be delivered in real-time to, for example, a display system of the vehicle or user device, such as mobile phone of the driver.

The various data from the preceding examples may be stored at and retrieved from various data sources, such as an external traffic databases containing traffic data (e.g., amounts of traffic, average driving speed, traffic speed distribution, and numbers and types of accidents, etc.) about various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), and insurance company databases containing insurance data (e.g., driver score, coverage amount, deductible amount, premium amount, insured status) for the vehicle, driver, and/or other nearby vehicles and drivers. The data may, in some examples, be wirelessly transmitted from a remote server and/or database to the vehicle 220 for consideration by the autonomous driving insurance rating factor calculator 402. As explained earlier, vehicles 210 may leverage additional hardware and/or software capabilities of another vehicle 220 or vehicles to gain access to the driving data and other information, when desired. For example, a vehicle 220 may receive, through its long-range communications circuitry 222 (or mobile phone 225), driving data/information and forward it to vehicles 210 via their short-range communications 212 systems. As such, the vehicles 210, 220 may input the information into their autonomous driving insurance rating factor calculator 402 for consideration.

FIG. 5 shows the autonomous driving insurance rating factor calculator 502 receiving numerous inputs and outputting a distance-based autonomous driving insurance rating factor. In some examples, the autonomous driving insurance rating factor calculator 502 may be an application-specific integrated circuit (ASIC) designed to perform the functionality described herein. In other examples, the autonomous driving insurance rating factor calculator 502 may use a processing unit (e.g., comprising a computer processor, such as an Intel™ x86 microprocessor or other special-purpose processors) and computer-executable instructions stored in a memory to cause a driving analysis computer 214 to perform the steps described herein.

As shown in FIG. 2, a single vehicle-based driving analysis computer 214 may receive driving data for a first vehicle 210 (steps 301, 401), including driving data received from V2V communications including driving data for one or more other vehicles, may determine from the data whether the vehicle is engaged in an autonomous driving, and may determine a characteristic of the autonomous driving (step 302, 402, and 403), determine a property of an insurance policy based on the characteristic (step 304, 404), and adjust the insurance policy based on the determined property (step 305). However, other driving analysis computers and/or other computing devices may be used to some or all of the steps and functionality described above in reference to FIGS. 3, 4, and 5. For example, any of steps 301-305, 401-405 may be performed by a user's mobile device 215 or 225 within the vehicles 210 or 220. These mobile devices 215 or 225, or another computing device 230, may execute software configured to perform similar functionality in place of the driving analysis computers 214 and 224. Additionally, some or all of the driving analysis functionality described in reference to FIGS. 3, 4, and 5 may be performed by a driving analysis computer 251 at a non-vehicle based driving analysis server 250. For example, vehicles 210 and 220 may be configured to transmit their own vehicle sensor data, and/or the V2V communications data received from other nearby vehicles, to a central driving analysis server 250 via telematics devices 213 and 223.

While systems already exist for autonomous vehicles, such as the self-driving car by GOOGLE™, the spirit of this disclosure is not limited to just autonomous self-driving cars. For example, the vehicle 220 may be a completely autonomous vehicle, semi-autonomous vehicle, or a manual human-driven vehicle. As used herein, the term autonomous (e.g., autonomous vehicle) may refer to either semi-autonomous (e.g., semi-autonomous vehicle) or completely autonomous (e.g., completely autonomous vehicle). Depending on the capabilities of the vehicle 220, the vehicle may be equipped with the appropriate sensors 221 and other electronic components to enable the automation/semi-automation, as is already known in the relevant art of autonomous/semi-autonomous vehicles. Similarly, an autonomous drone vehicle may be equipped with the appropriate hardware and software to operate as an autonomous vehicle, semi-autonomous vehicle, or a manually-driven vehicle. In contrast, however, in some examples, an autonomous drone vehicle may be equipped with less hardware and/or software than a vehicle with complete autonomous capability because to some extent, the a drone vehicle may rely upon the lead vehicle to provide guidance and commands for controlling the speed, acceleration, braking, cornering, route, and other operation of the following vehicle. For example, a following drone vehicle may transmit data to the lead vehicle using its short-range wireless communications system, and rely upon long-range wireless communication capabilities of the lead vehicle to forward the data to the appropriate final destination. At least one benefit of such an arrangement is that the cost/price of a following drone vehicle may be less than that of other vehicles (e.g., lead vehicle) due to reduced complexity and reduce hardware and/or software requirements. In an embodiment, an autonomous driving system quality rating takes into account whether a vehicle is equipped for autonomous droning.

In addition, the integrity of collected vehicle driving data may be validated by comparing, e.g., by a driving analysis computer, the driving data (e.g., location, speed, direction) from one vehicle's sensors 211 with corresponding driving data from a nearby vehicle 220. In one example, driving data of the nearby vehicle can be collected by a data acquiring component of a following/drone vehicle 210 via, for example, vehicle V2V. In one example, the driving data of the nearby vehicle may be directly received from the nearby vehicle.

Figure 6:
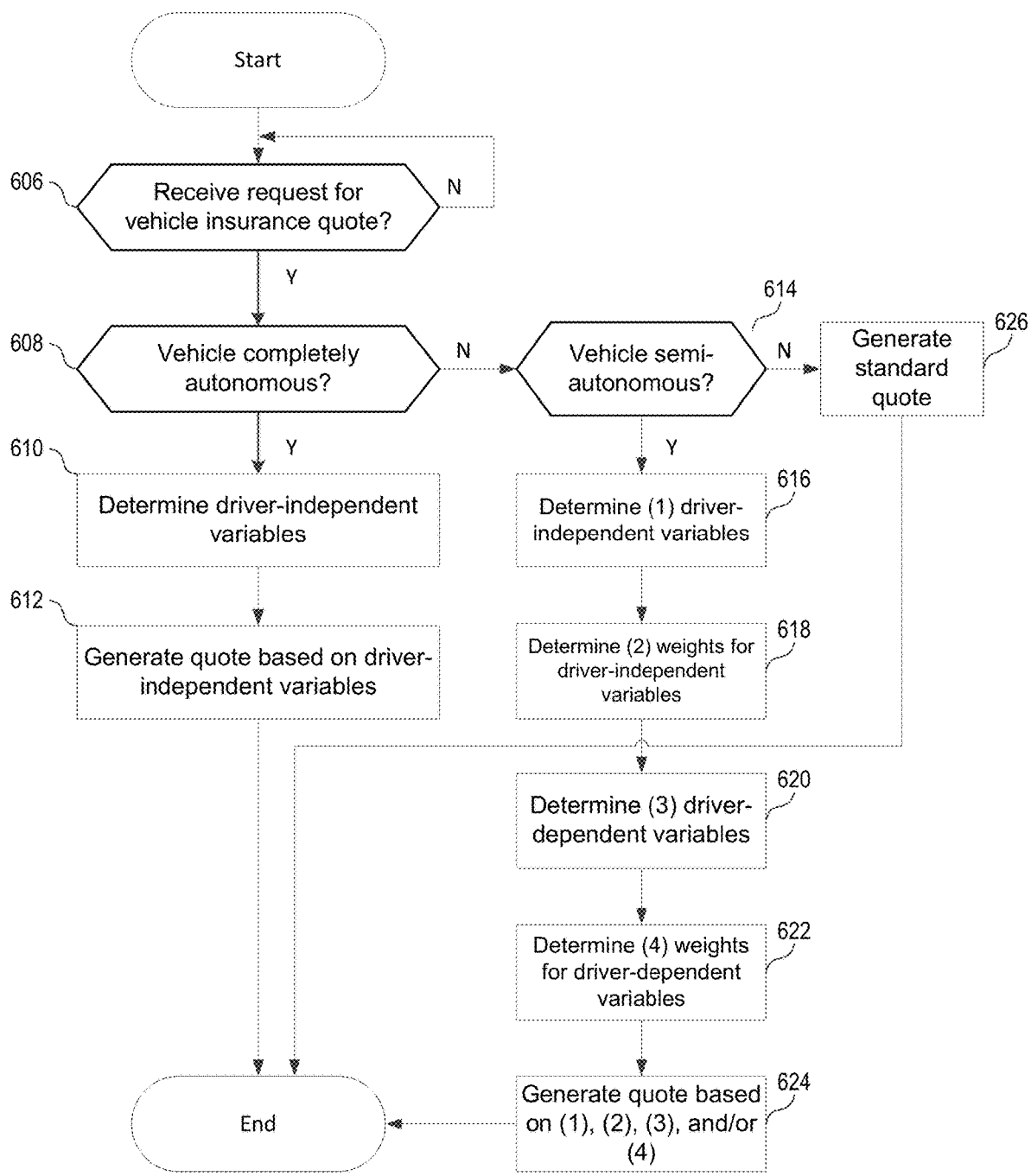
FIG. 6 is a flow diagram illustrating an example method of generating vehicle insurance rates based on driver-independent variables and/or driver-dependent variables according to one or more aspects of the disclosure.

FIG. 6 is a flow diagram illustrating an example method of generating vehicle insurance rates based on driver-independent variables and/or driver-dependent variables according to one or more aspects of the disclosure. The steps illustrated in FIG. 6 may be performed by one or more computing device 101. For example, a vehicle computing device (e.g., driving analysis computer 214 or vehicle control computer 217) and/or a driving analysis computing device (e.g., driving analysis computer 251) may perform one or more of the steps illustrated in FIG. 6.

In step 606, a computing device may determine whether a request to determine a property of an insurance policy, such as an insurance quote for a vehicle, has been received. If a request has not been received (step 606: N), the computing device may wait until a request has been received. Alternatively, the computing device might not wait for a request before determining the property of the insurance policy.

In step 608, the computing device may determine whether the vehicle to be quoted is completely autonomous. If the vehicle is not completely autonomous, the computing device may determine whether the vehicle is semi-autonomous in step 614. The computing device may make each of these determinations by comparing the features of the vehicle with the features included in an exemplary (or standard) completely autonomous vehicle or an exemplary (or standard) semi-autonomous vehicle. The features for exemplary vehicles may be stored in, for example, a database, such as database 252.

Completely autonomous vehicles may have more autonomous features than semi-autonomous vehicles. For example, the standard completely autonomous vehicle may have a first group of features, such as autonomous speed control, autonomous steering, autonomous braking, and autonomous parallel parking. The standard semi-autonomous vehicle may have a second group of features, which may be a subset of the first group of features. For example, the standard semi-autonomous vehicle may have autonomous braking and autonomous parallel parking. These classifications may be stored in a database.

If the vehicle to be quoted has all of the features of the standard completely autonomous vehicle (e.g., based on a comparison of the features of the vehicle to be quoted and the features of the standard completely autonomous vehicle), the computing device may determine that the vehicle to be quoted is a completely autonomous vehicle (step 608: Y). If the vehicle to be quoted has all of the features of the standard semi-autonomous vehicle, the computing device may determine that the vehicle is a semi-autonomous vehicle (step 614: Y). If the vehicle does not have all the features of the standard semi-autonomous vehicle (step 614: N), the computing device may determine that the vehicle is a non-autonomous or standard vehicle.

While three different classifications have been described (e.g., completely autonomous, semi-autonomous, and non-autonomous), any number of classifications may exist. For example, five different classifications may be used: (1) assisted, (2) partial automation, (3) conditional automation, (4) high automation, and (5) full automation. In assisted mode, the vehicle's computer-operated systems may assist in emergency situations. The system takes over either steering or acceleration in specific modes using information about the driving environment. The driver may do everything else. Exemplary autonomous features in the assisted mode may include lane keeping automation, cruise control, electronic stability control, and automatic braking.

In partial automation mode, the automation system may take control of steering and acceleration in specific driving modes using information about the driving environment. The driver may do everything else. This mode may be beneficial in low speed environments, if there are no (or very few) intersections, and the driver is alert. Exemplary autonomous features in the partial automation mode may include traffic jam assist and adaptive cruise control, in addition to or instead of the autonomous features in the assisted mode.

In conditional automation, the system may perform all (or most) aspects of the dynamic driving task in specific driving modes. The driver may be available to respond to a request by the autonomous system to intervene. For example, the driver may be present in driver's seat but would not have to stay alert to the driving environment. Exemplary autonomous features in the conditional automation mode may include a traffic-jam autopilot system, in addition to of instead of the autonomous features in the partial automation mode.

In high automation mode, the system may perform all aspects of the dynamic driving task in specific driving modes, even if the human driver does not respond appropriately to a request to intervene. For example, a full freeway autopilot system may be used. The driver, in some circumstances, may input a desired destination but might not be expected to take an active role in driving the vehicle. Exemplary autonomous features in the high automation mode may include a full freeway autopilot system, in addition to or instead of the autonomous features in the partial automation mode.

In full automation mode, the system may perform all aspects of the dynamic driving task in all driving modes under all roadway conditions. Vehicles running in this mode may include truly driverless cars, such as robotic taxis. Exemplary autonomous features in the high automation mode may include autonomous features in addition to or instead of the autonomous features in the high automation mode.

Any number of levels of vehicle automation may be used, including those defined by standards-setting organizations, such as the National Highway Traffic Safety Administration (NHTSA) and SAE International. For example, the definitions available in the NHTSA's "Preliminary Statement of Policy Concerning Automated Vehicles" may be used, the entirety of which is hereby incorporated by reference. "Preliminary Statement of Policy Concerning Automated Vehicles," NHTSA, May 30, 2013, available at http://www.nhtsa.gov/staticfiles/rulemaking/pdf/Automated_Vehicles_Policy.pdf. As another example, the definitions available in SAE International's "Summary of Levels of Driving Automation for On-road Vehicles," may be used, the entirety of which is hereby incorporated by reference. Bryant Walker Smith, "Summary of Levels of Driving Automation for On-road Vehicles," Center for Internet and Society, Stanford Law School, Dec. 18, 2013, available at http://cyberlaw.stanford.edu/blog/2013/12/sae-levels-driving-automation. As will be described in further detail in the examples below, the classification of the vehicle may be used to determine the types of variables (e.g., driver-independent variables or driver-dependent variables) considered in generating an insurance quote or other property of an insurance policy for the vehicle.

The vehicle classification may change between completely autonomous, semi-autonomous, and non-autonomous over time. In some aspects, a change in the classification system may prompt a change in the vehicle classification. For example, at a first time, a vehicle may be classified as completely autonomous if it has feature A, feature B, feature C, and feature D. At a second time later than the first time, the classification system may change the definition of a completely autonomous vehicle to a vehicle that has features A-D along with feature E. If the quoted vehicle has features A-D, but not feature E, it may be classified as a completely autonomous vehicle at the first time. However, the classification may change from completely autonomous to semi-autonomous in the future (e.g., at the second time) based on the change in the classification system.

The vehicle's classification may also change based on a change in the vehicle's autonomous features. For example, assume that a vehicle is classified as completely autonomous if it has features A-D. The vehicle may have been classified as a semi-autonomous if, in the past, the vehicle had features A-C. However, the vehicle may be updated with feature D (e.g., an automated steering feature) at a later time. The computing device may re-classify the vehicle as completely autonomous at the later time.

If the vehicle is completely autonomous (step 608: Y), the computing device, in step 610, may determine one or more driver-independent variable used to generate an insurance quote for the vehicle. The driver-independent variable may comprise a vehicle identifier, such as a Vehicle Identification Number (VIN). The computing device may obtain the vehicle identifier from the driver or retrieve it from a database, such as a driver motor vehicle (DMV) database, a database of the insurance provider if the driver previously provided the vehicle identifier, or any other database. Using the vehicle identifier, the computing device may determine additional data associated with the vehicle identifier, such as the make, year, and model of the vehicle, the autonomous or safety features of the vehicle, or any other information for the vehicle. The computing device may provide the vehicle identifier to a database or search engine, such as a VIN system, and the database or search engine may provide the computing device with the additional information.

In some aspects, the vehicle information in a VIN system might not be up to date. For example, a newer vehicle, such as a vehicle released within the last year, might have new safety and/or autonomous features that are not currently associated with the VIN for the vehicle. A user, such as an agent or administrator, may update the VIN system by manually adding new vehicle information to the VIN system or updating existing information in the system. For example, the user may input, through a computing device, the autonomous features for a particular type of vehicle or for a particular VIN into the VIN system. Accordingly, the autonomous features for each VIN in the VIN system may be kept up to date.

In step 612, the computing device may generate an insurance quote or other property of an insurance policy based on one or more of the driver-independent variables determined in step 610. As previously discussed, the property of the insurance policy may comprise a premium, a deductible, a coverage term, a coverage amount, or any other insurance property. In some aspects, the computing device may generate a quote based on the identifier of the vehicle, and not based on any driver-dependent variables. In other words, the computing device may generate a quote and/or bind based on the vehicle identifier alone and not based on personal information of the driver (e.g., age, credit score, driving history, etc.) because the driver's characteristics might not matter if the vehicle is completely autonomous.

The vehicle's classification may change from semi-autonomous to completely autonomous, as previously discussed. Correspondingly, the computing device may change the insurance quote to be based on driver-independent variables and not based on driver-dependent variables. As vehicles become more and more autonomous, fewer driver-dependent rating variables may be introduced and a number of them may be eliminated or rolled off. Greater reliance may be placed on driver-independent variables, such as the VIN for quotes, binds, and/or discounts.

If the vehicle to be quoted is not completely autonomous (step 608: N) but is semi-autonomous (step 614: Y), the computing device, in step 616, may determine one or more driver-independent variable for generating a quote, as previously discussed with reference to step 610. Because the vehicle is semi-autonomous, characteristics of the driver may be relevant, and the computing device may also rely on driver-dependent variables to generate the quote. Weights may be used for the driver-independent variables and/or driver-dependent variables to emphasize some variables over other variables.

In step 618, the computing device may determine one or more weights for the driver-independent variables determined in step 616. In step 620, the computing device may determine one or more driver-dependent variable used to generate the quote. Exemplary driver-dependent variables include, but are not limited to, the age of the driver, a geographic location of the driver (e.g., the location of the driver's residence), driving record, credit score, whether the driver owns a home, and the like. In step 622, the computing device may determine one or more weights for the driver-dependent variables.

In step 624, the computing device may generate an insurance quote (or other property of an insurance policy) based on the variables and weights. Several non-limiting examples of this determination will now be provided. For these examples, the following exemplary driver-independent variables will be used: vehicle model and vehicle year. The following exemplary driver-dependent variables will also be used: driver's age and driver's residence.

The computing device may determine a value for each of the variables considered. In some aspects, the values may be on the same scale, such as a 1-10 scale. The computing device may determine the values by comparing a characteristic of the driver or of the vehicle with a database that correlates characteristics with values. For example, the computing device may assign a value of 4 for the vehicle model variable if the vehicle is a small 2-door automobile, and the database correlates small 2-door automobiles with the value of 4. Similarly, the computing device may assign a value of 9 for the vehicle year variable if the vehicle was manufactured in 2013, and the database correlates 2013 vehicles with the value of 9. The computing device may assign a value of 3 for the driver's age variable if the driver is 20 years old, and the database correlates drivers between the ages of 18 and 24 with the value of 3. Finally, the computing device may assign the value of 8 for the driver's residence if the driver lives in Iowa, and the database correlates drivers residing in Iowa with the value of 8.

The computing device may also determine a weight for each variable (vehicle model, vehicle year, driver's age, and driver's residence) or for each type of variable (driver-independent or driver-dependent). In some aspects, the weights may be used to emphasize one or more variables over one or more other variables. For example, a weight of 0.20 may be applied to the vehicle model variable, a weight of 0.40 may be applied to the vehicle year, a weight of 0.10 may be applied to the driver's age, and a weight of 0.30 may be applied to the driver's residence. In this example, the vehicle may be given a score of 7.10 (e.g., 0.20*4+0.40*9+0.10*3+0.30*8=7.10). The score and/or the weights and variables determined in steps 616, 618, 620, and 622 may be used by the computing device to generate the quote in step 624.

In some aspects, weights for the same types of variables (e.g., driver-independent or driver-dependent) may be the same. For example, driver-independent variables may each be assigned the weight of 0.20. Driver-dependent variables may each be assigned the weight of 0.30. In this example, the vehicle may be given a score of 5.90 (e.g., 0.20*4+0.20*9+0.30*3+0.30*8=5.90).

The weights may depend on the level of autonomy of the vehicle. The more autonomous the vehicle, the greater the weights for the driver-independent variables and the smaller the weights for the driver-dependent variables. If the vehicle changes from semi-autonomous to completely autonomous, the weights for the driver-dependent variables may drop to 0 (or drop to near zero) so that driver-dependent variables are not considered (or are at least weighted less) when determining an insurance quote for the vehicle. Determining the level of autonomy will be described in further detail below in reference to FIG. 7.

In step 626, the computing device may generate a standard quote if the vehicle is a non-autonomous vehicle or otherwise does not qualify as completely autonomous or semi-autonomous.

Figure 7:
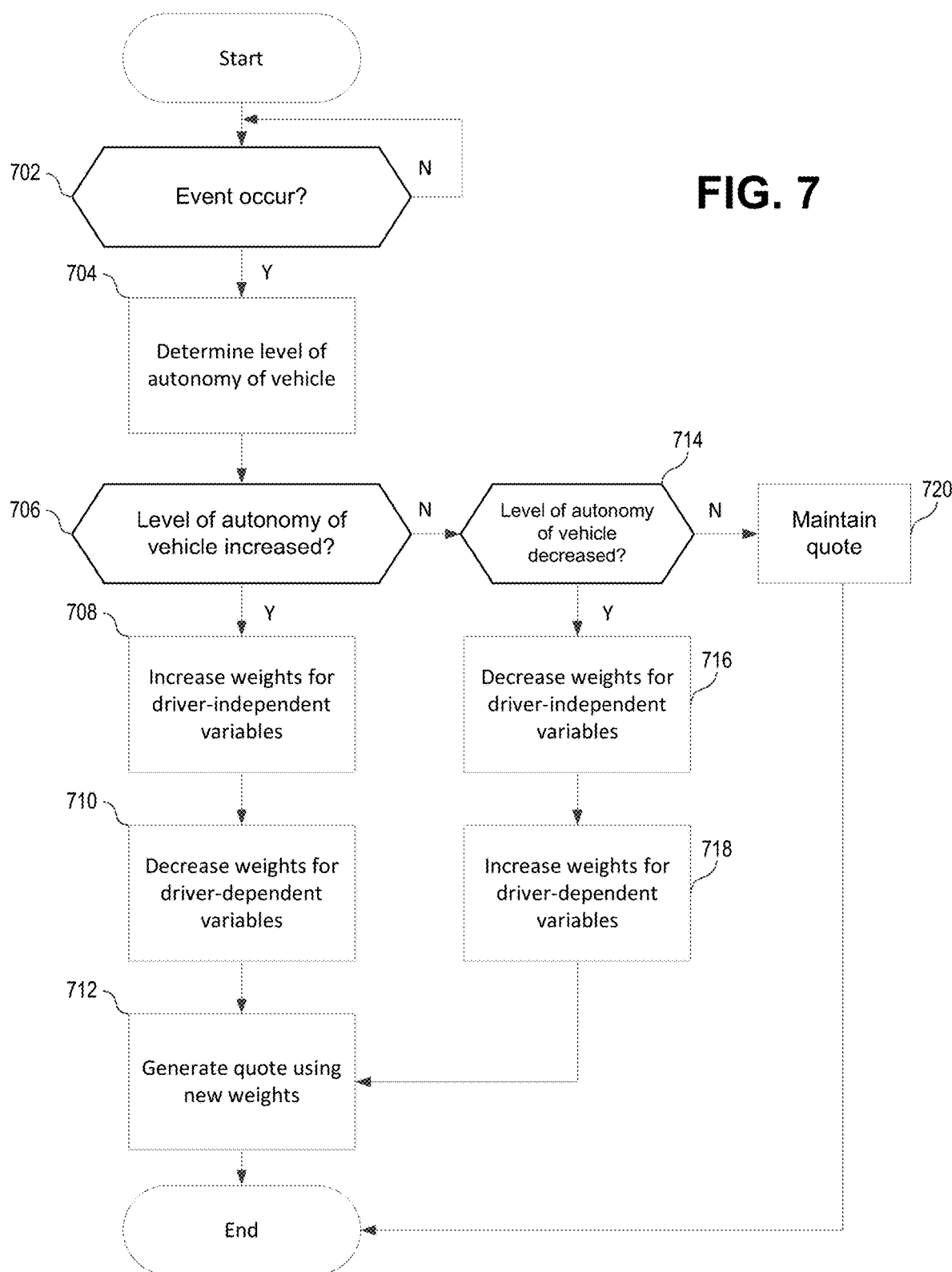
FIG. 7 is a flow diagram illustrating an example method of generating vehicle insurance rates based on changes in the level of autonomy of vehicles according to one or more aspects of the disclosure.

FIG. 7 is a flow diagram illustrating an example method of generating vehicle insurance rates based on changes in the level of autonomy of vehicles according to one or more aspects of the disclosure. The steps illustrated in FIG. 7 may be performed by one or more computing device 101. For example, a vehicle computing device (e.g., driving analysis computer 214 or vehicle control computer 217) and/or a driving analysis computing device (e.g., driving analysis computer 251) may perform one or more of the steps illustrated in FIG. 7.

In step 702, the computing device may optionally determine whether an event has occurred, such as receiving a request for a vehicle re-quote and/or determining that the level of autonomy of the insured vehicle has changed since the time of the original quote or bind. For example, the computing device may automatically detect a change in the level of autonomy of the vehicle, and generate a quote in response to the detection. The vehicle may send data identifying its level of autonomy to the computing device in response to a change in the level of autonomy or periodically (e.g., weekly, monthly, etc.). Additionally or alternatively, the computing device may retrieve information identifying a vehicle's level of autonomy from a database, such as a third party database. The database may be updated with level of autonomy information for a plurality vehicles or vehicle types (e.g., make, model, year, etc.). The computing device may retrieve the correct information by providing the database with the VIN, model and year, or any other information identifying the vehicle. If an event has not occurred (step 702: N), the computing device may optionally wait for an event to occur.

In step 704, the computing device may determine the level of autonomy of the vehicle to quote. The level of autonomy may be based on the overall classification of the vehicle (e.g., completely autonomous, semi-autonomous, or non-autonomous), as previously discussed. The level of autonomy may additionally or alternatively be based on each autonomous feature of the vehicle (e.g., automatic speed control, automatic steering, automatic braking, automatic parallel parking, and the like). For example, the computing device may count the number of autonomous features to determine the level of autonomy. The computing device may also apply weights to each of the autonomous features to determine the level of autonomy. For example, automatic steering may be emphasized more than automatic braking, and automatic braking may be emphasized more than automatic parallel parking.

The computing device may determine whether a level of autonomy of the vehicle has changed, such as from the last time a quote or bind was generated for the vehicle. For example, in step 706, the computing device may determine whether the level of autonomy increased. If the level of autonomy has not increased (step 706: N), the computing device may determine whether the level of autonomy has decreased in step 714. If the level of autonomy has not changed, the computing device may maintain the original quote or bind in step 720.

The computing device may determine that the level of autonomy of the vehicle has changed if the classification of the vehicle has changed, which (as previously discussed) may have been caused by a change in the classification system or a change in the autonomous features of the vehicle. The computing device may additionally or alternatively detect a change in the level of autonomy based on a modification, addition, or removal of an automated feature. For example, if the software or hardware for an autonomous feature, such as autonomous braking, has been upgraded, the computing device may determine that the level of autonomy increased (step 706: Y). Alternatively, the computing device may determine that the level of autonomy decreased if an autonomous feature is removed and/or has been disabled (step 714: Y).

In response to a determination that the level of autonomy of the vehicle has changed, the computing device may adjust (e.g., increase or decrease) the weights for one or more of the variables. For example, the computing device may increase a weight for a driver-independent variable in step 708 and/or decrease a weight for a driver-dependent variable in step 710 if the level of autonomy has increased (step 706: Y). On the other hand, the computing device may decrease a weight for the driver-independent variable in step 716 and/or increase a weight for the driver-dependent variable in step 718 if the level of autonomy has decreased (step 714: Y).

In step 712, the computing device may generate a quote (or other property of the insurance policy) using the new weights. For example, if the vehicle is now more autonomous, the computing device may determine the quote based on at least one of an increased weight for a driver-independent variable of the vehicle and a decreased weight for a driver-dependent variable of the vehicle. The weights for the driver-dependent variables may eventually drop to 0, and a quote may be based on one or more driver-independent variables, but not based on driver-dependent variables. This may occur, for example, if the vehicle becomes classified as completely autonomous. If, on the other hand, the vehicle is now less autonomous, the computing device may determine the quote based on at least one of a decreased weight for a driver-independent variable of the vehicle and an increased weight for a driver-dependent variable of the vehicle.

In some aspects, the level of autonomy may change multiple times, such as during one or more of the driver's trips with the vehicle. The computing device may determine an average or median level of autonomy and generate a value for a property of the insurance policy based on the average or median level of autonomy. Additionally or alternatively, the value for the property of the insurance policy may vary over time. For example, the computing device may determine that the vehicle was used at a first level of autonomy over a first period of time (e.g., April). During a second period of time after the first (e.g., May), the computing device may determine that the vehicle was used at a second level of autonomy greater than the first level of autonomy. Accordingly, the computing device may vary, such as decrease, the value for the property of the insurance policy (e.g., deductible, premium, and the like) for the second period of time relative to the value for the first period of time. Thus, variable rate insurance may be generated based on the level of autonomy of the vehicle over predetermined periods of time (e.g., each month, every 3 months, and the like). The vehicle, driver, or owner may be notified of the decrease or increase in the value of the insurance policy, which may encourage the driver or owner of the vehicle to use more autonomous features to decrease the amount of the deductible or premium.

Figure 8:
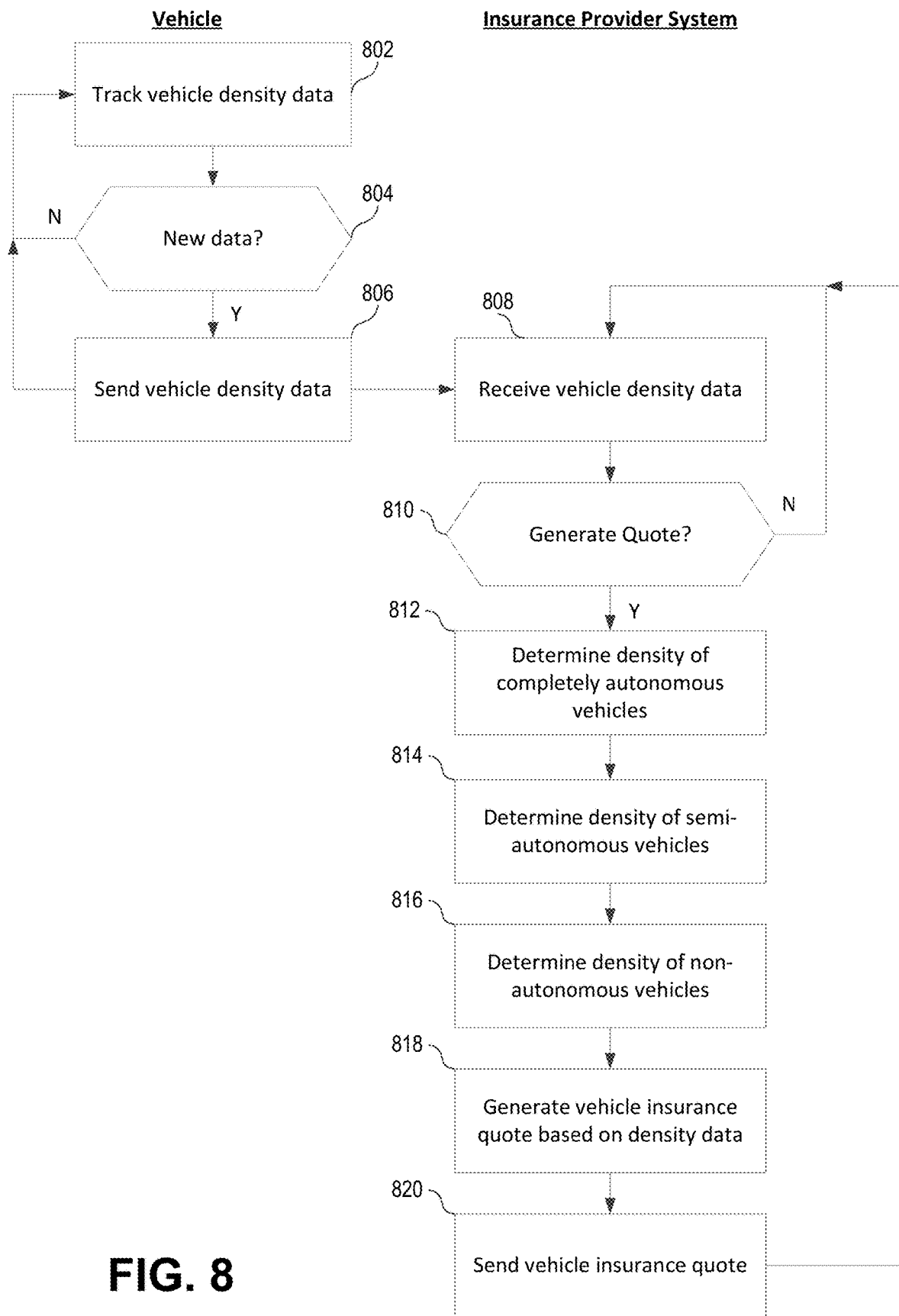
FIG. 8 is a flow diagram illustrating an example method of tracking vehicle density and/or generating vehicle insurance rates based on vehicle density according to one or more aspects of the disclosure.

FIG. 8 is a flow diagram illustrating an example method of tracking vehicle density and/or generating vehicle insurance rates based on vehicle density according to one or more aspects of the disclosure. The steps illustrated in FIG. 8 may be performed by one or more computing device 101. For example, a vehicle computing device (e.g., driving analysis computer 214 or vehicle control computer 217) and/or a driving analysis computing device (e.g., driving analysis computer 251) may perform one or more of the steps illustrated in FIG. 8.

In step 802, a computing device may monitor the density (e.g., congestion) of vehicles around an insured vehicle or vehicle to be quoted (also referred to as a target vehicle). The computing device may generate and store the density data for use in determining an insurance quote for the target vehicle. In some aspects, the computing device may be a computing device within the target vehicle. The target vehicle may have one or more sensors used to determine (e.g., sense) the number of vehicles near the target vehicle. Exemplary sensors were previously discussed with reference to FIG. 2, and may include one or more of the following types of sensors: a camera, a proximity sensor, a vehicle-to-vehicle (V2V) communication device, and a vehicle-to-infrastructure (V2I) communication device.

In some aspects, the computing device may determine the number of vehicles based on a number of interactions, such as communications, between the target vehicle and other vehicles (e.g., via V2V communication devices) over a predetermined period of time. The target vehicle may also determine the number of completely autonomous vehicles, semi-autonomous vehicles, and/or non-autonomous vehicles based on the V2V communications (or lack thereof). For example, other vehicles may communicate vehicle identifying information to the target vehicle, such as make, model, year, automated features it has, VIN, etc. Based on the received information, the target vehicle may determine whether the other vehicle is completely autonomous, semi-autonomous, and/or non-autonomous. In some aspects, if another vehicle does not communicate with the target vehicle, the target vehicle may determine that the other vehicle is a non-autonomous vehicle. This information may be used to generate the insurance quote for the vehicle, as will be described in further detail in the examples that follow.

The computing device may also determine the number of vehicles from data stored by road infrastructure. For example, the road infrastructure may store a count of the number of vehicles that have passed a particular point on the road. When the target vehicle drives within a predetermined distance from the road infrastructure, the target vehicle may communicate with the road infrastructure (e.g., via V2I communication devices) and receive the vehicle count from the road infrastructure. The computing device may also determine the number of vehicles based on other devices capable of being used to track location, such as mobile phones and/or other Global Positioning Satellite (GPS) devices. Accordingly, the computing device may determine vehicle count and/or vehicle density independent from an absolute geographical location of the vehicle. In other words, geography might not be a factor in determining the insurance quote.

The computing device may additionally or alternatively determine the number of vehicles near the target vehicle and/or otherwise generate vehicle density data based on one or more databases, such as third party databases. For example, the computing device may retrieve data from a navigation tool database, such as a GOOGLE MAPS database, and determine the number of vehicles or vehicle density near the target vehicle based on the retrieved data. In some aspects, data from the vehicle's sensors and data retrieved from a database may be combined to determine the number of vehicles and/or density data.

Vehicle density may be based on the number of vehicles within a predetermined distance from the target vehicle. For example, the target vehicle may use its sensors to monitor the number of vehicles within a predetermined radius (e.g., 30 feet) of the target vehicle. Additionally or alternatively, the predetermined distance may be a predetermined distance of the target vehicle along a path of the target vehicle. For example, if the target vehicle is on a highway, the density measured may be from the vehicle's location to a predetermined distance in front of the vehicle along the highway (e.g., 1 mile in front of the vehicle) and/or a predetermined distance behind the vehicle along the highway (e.g., 0.5 miles behind the vehicle).

In step 804, the vehicle computing device may determine whether new data is available, and in step 806, the vehicle computing device may send the vehicle count or density data to a driving analysis computing device if new data is available. The data may be transmitted periodically (e.g., every 5 days), occasionally, and/or in real time (e.g., while the vehicle is on the road and new data is detected). In step 808, the driving analysis computing device may receive the vehicle count or density data from the vehicle computing device. Steps 804, 806, and 808 may be optional if, for example, the driving analysis computing device receives the data from other sources, such as directly from the road infrastructure or from another database. In step 810, the driving analysis computing device may optionally determine whether to generate an insurance quote (or other property of an insurance policy) for the target vehicle.

The computing device may determine the density of vehicles near the target vehicle based on the vehicle number data received from the vehicle, road infrastructure, and/or various databases. In some aspects, the computing device may determine vehicle density based on vehicle type. In step 812, the computing device may determine the density of completely autonomous vehicles near (e.g., within a predetermined distance from) the target vehicle. In step 814, the computing device may determine the density of semi-autonomous vehicles near the target vehicle. In step 816, the computing device may determine the density of non-autonomous vehicles near the target vehicle.

In step 818, the computing device may generate an insurance quote (which may comprise a premium amount) for the target vehicle based on the determined density of vehicles. In some aspects, the computing device may determine the average and/or median density of vehicles over a particular period of time (e.g., 1 month, 3 months, etc.). The quote may be higher if the target vehicle typically travels in a denser area, such as New York City, and lower if the vehicle typically travels in a less dense area, such as Perry, Iowa. The computing device may make adjustments to the quote based on a comparison of the density of completely autonomous vehicles, the density of semi-autonomous vehicles, and/or the density of non-autonomous vehicles. For example, the quote may be higher if the density of non-autonomous vehicles is higher (e.g., above a threshold amount). Alternatively, the quote may be lower if the density of completely autonomous or semi-autonomous vehicles is higher (e.g., above a threshold amount). The computing device may also apply different weights to each of the three vehicle density numbers. The use of weights was previously discussed with reference to FIGS. 6 and 7. In some aspects, the quote may also be based at least in part on the level of autonomy of the target vehicle, as also discussed with reference to FIGS. 6 and 7. For example, the quote may be increased if the target vehicle is non-autonomous or decreased if the target vehicle is semi-autonomous or completely autonomous.

In step 820, the computing device may send the vehicle insurance quote to the driver or owner of the target vehicle and/or an agent of the insurance provider. The computing device may return to step 808 to wait for updated vehicle density or count data.

Figure 9:
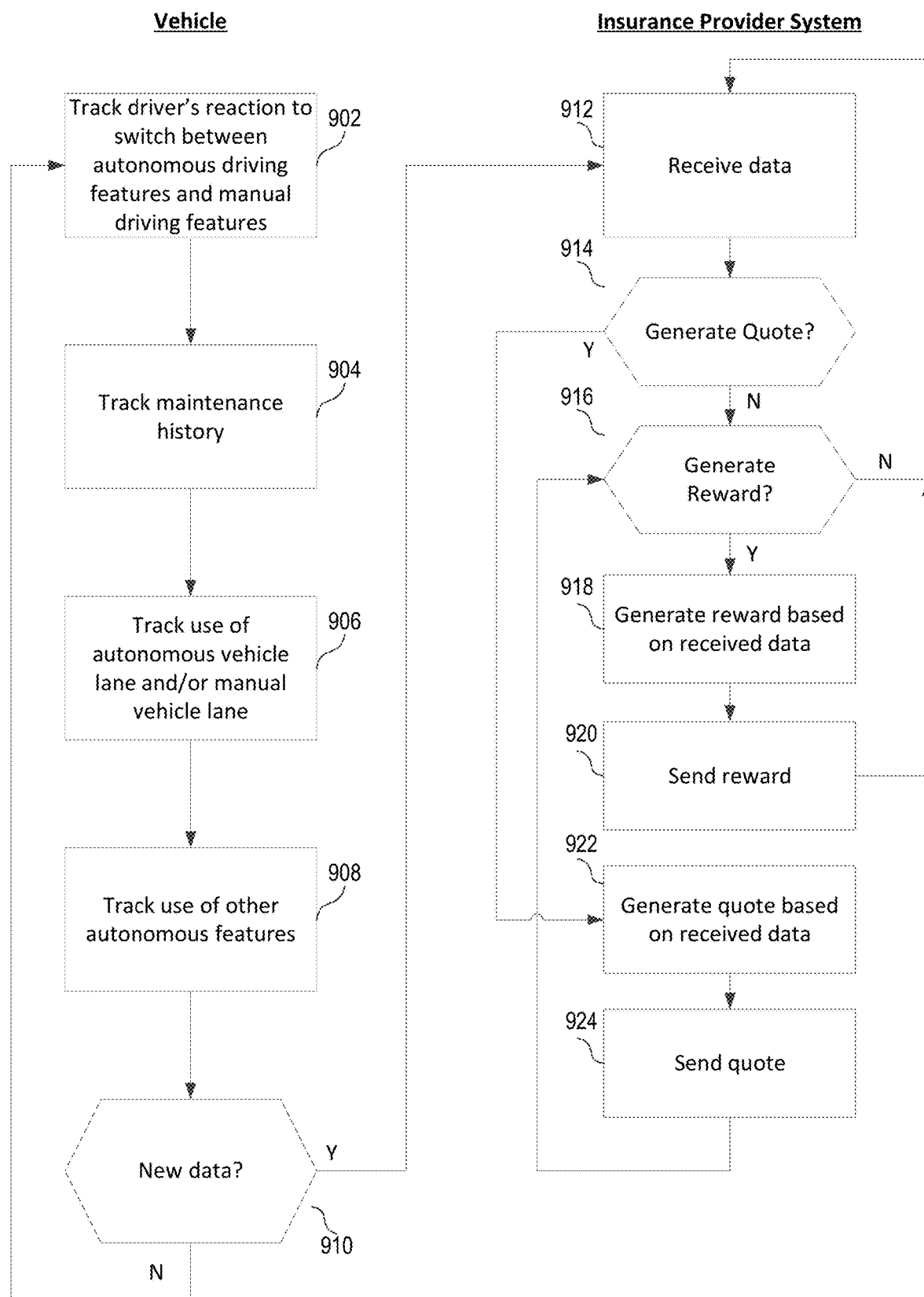
FIG. 9 is a flow diagram illustrating an example method of analyzing use of autonomous vehicle features and/or maintenance of autonomous vehicles according to one or more aspects of the disclosure.

FIG. 9 is a flow diagram illustrating an example method of analyzing use of autonomous vehicle features and/or maintenance of autonomous vehicles according to one or more aspects of the disclosure. The steps illustrated in FIG. 9 may be performed by one or more computing device 101. For example, a vehicle computing device (e.g., driving analysis computer 214 or vehicle control computer 217) and/or a driving analysis computing device (e.g., driving analysis computer 251) may perform one or more of the steps illustrated in FIG. 9. As will be described in further detail in the examples below, the computing device may generate an insurance quote or reward based on one or more factors, including the driver's response to switching between an autonomous driving feature (e.g., autonomous steering) and a manual driving feature (e.g., manual steering).

In step 902, the computing device may track a driver's reaction to a vehicle switching between its autonomous driving features (or autonomous driving modes) and its manual driving features (or manual driving modes). A vehicle may have several different gradations of driving modes, between fully autonomous and fully manual. Each driving mode may be determined based on the autonomous features that are available or active. For example, a manual driving mode may have no autonomous features. A first autonomous driving mode may have autonomous features A and B active. A second autonomous driving mode more autonomous than the first autonomous driving mode may have autonomous features A, B, and C active. In a fully autonomous driving mode, the vehicle may have all (or a substantial number) of its autonomous features active, such as autonomous features A, B, C, D, E, and F. Any number of gradations may be available, and the computing device may determine the mode based on a detection of which autonomous features of the vehicle are active (or available).

Each driving mode may additionally or alternatively be a specific-purpose driving mode. For example, on autonomous mode may be an autonomous parking mode. In this mode, the vehicle's autonomous parking feature (e.g., parallel parking or other type of parking) may be activated. In a highway driving autonomous mode, the vehicle's autonomous steering control and autonomous speed control features may be activated. In a collision avoidance autonomous mode, the vehicles' autonomous braking and autonomous steering features may be activated. Any number of driving modes with different autonomous features activated may be available.

Switching between the two features or modes may be beneficial for a variety of reasons. For example, the driver might not have experience with one or more of the autonomous driving features of the vehicle. The autonomous driving features may gradually be activated over time as the driver becomes accustomed to autonomous driving. A vehicle may also switch between autonomous and manual features based on present road conditions. For example, autonomous steering and speed control may be more beneficial if the vehicle density is very low where the driver is prone to dozing off. Alternatively, manual steering and speed control may be more beneficial if the vehicle density is very high, and the driver can quickly react to changing traffic conditions. Furthermore, one or more autonomous feature may be turned off in order to teach and maintain the driver's driving skills.

In some aspects, one or more autonomous driving feature may be switched off. For example, a computing device, which may be within the vehicle, may send an instruction to the vehicle to switch off an autonomous driving feature. The driver may be notified that the autonomous driving feature has been switched off by, for example, an audio, visual, and/or tactile notification inside the vehicle. The computing device may determine the driver's response to the autonomous driving feature being switched off. Additionally or alternatively, the computing device may determine a history of the driver's response to the autonomous driving feature being switched off over a period of time. For example, the feature may be switched off multiple times, and the driver's response to each of those instances may be tracked.

The driver's reaction time may be monitored. For example, if autonomous speed control is turned off, the amount of time it takes for the driver to maintain or get back up to the speed that the vehicle was traveling at with autonomous speed control active may be tracked. As another example, the vehicle may switch off its autonomous parallel parking feature. The amount of time it takes for the driver to parallel park the vehicle may be monitored.

In step 904, the computing device may track the maintenance history of the vehicle. For example, the driver's response time to maintenance notifications may be monitored. Exemplary, non-limiting maintenance notifications include a check engine notification, an oil level notification, a low fuel notification, a software upgrade availability notification, a vehicle hardware or software hack notification, and the like. For example, if the driver is notified that a software upgrade for the vehicle (or a component in the vehicle) becomes available, the computing device may track how long it takes for the driver to begin downloading and/or installing the software upgrade. Similarly, if the vehicle learns that it (or a particular vehicle component) has been hacked, the computing device may track how long it takes for the driver to remediate the hack by, for example, bringing the vehicle to a service location, downloading a patch to prevent future hacks, downloading anti-hacking or anti-virus software, and/or replacing the hacked component. In some aspects, the insurance provider may also provide updates to the vehicle's security software. These updates may be automatically pushed to the vehicle. The insurance provider may charge an additional premium for the updates.

In step 906, the computing device may track the vehicle's use of autonomous vehicle lanes and/or manual vehicle lanes. Certain roads may include lanes dedicated to autonomous vehicles, lanes dedicated to non-autonomous vehicles, and/or lanes available to both autonomous vehicles and non-autonomous vehicles. As will be described in further detail in the examples below, the driver's insurance quote may be decreased and/or the driver may be given discounts or other rewards the more often the driver uses the autonomous vehicle lanes. This may be beneficial to both the insurance provider and the driver because the autonomous vehicle lane may be safer than the non-autonomous vehicle lane in some environments.

In step 908, the computing device may track the driver's use of other autonomous features, such as autonomous parallel parking. The more often the driver uses an autonomous feature, the greater the driver's discount may be. For example, if the driver uses autonomous parallel parking at least twice per week, a $10.00 discount on the insurance premium may be provided. If the driver uses autonomous parallel parking at least once per week, a $5.00 discount may be provided.

In step 910, the computing device may optionally determine whether there is any new data from the vehicle's computing device. If not (step 910: N), the vehicle's computing device may continue to track and store the vehicle operational data previously discussed. In step 912, a driving analysis computing device (which may be located remotely from the vehicle's computing device) may receive the monitored data from the vehicle's computing device.

In step 914, the computing device may optionally determine whether to generate a quote for the driver based on the monitored data. For example, the computing device may receive a request to generate a quote. In step 922, the computing device may generate an insurance quote (or other property of an insurance policy) for the vehicle. The insurance quote may be based on one or more of the driver's response to an autonomous feature being switched on or off, the driver's response to maintenance notifications, the driver's use of autonomous or non-autonomous vehicle lanes, and/or the driver's use of other autonomous features (e.g., autonomous parallel parking). The data used to generate the quotes may be based on the information tracked and stored in steps 902, 904, 906, and/or 908. As previously discussed, the quote may be based on a score determined for the vehicle or driver. The score may be based on one or more values for each piece of data considered as well as one or more weights assigned to those pieces of data. In step 924, the computing device may send the quote to the driver or to an agent of the insurance provider.

Other factors may be considered to determine the insurance quote. For example, the computing device may determine whether and how often the vehicle is driven off peak. Furthermore, the quote may be based on a record of incidents tracked by the vehicle's sensors or computing device, such as the driver momentarily veering out of a lane, the distance between the target vehicle and a vehicle in front of the target vehicle, how hard the driver brakes, or any other factors. The quote may be reduced if the driver does not have any incidents or has a limited number of incidents during a predetermined period of time that the driver's habits are tracked.

The computing device may determine a reward, such as a discount on a premium or deductible, alternatively to or additionally to a quote in a similar manner as it determines the quote (e.g., based on one or more of the factors previously discussed). In particular, in step 916, the computing device may determine whether to generate a reward for the driver based on the monitored data, and in step 918, the computing device may generate the reward based on the monitored data. A reward may be generated in lieu of the quote if the driver is, for example, already a customer of the insurance provider. In step 920, the computing device may send the reward to the driver or to an agent of the insurance provider.

Figure 10:
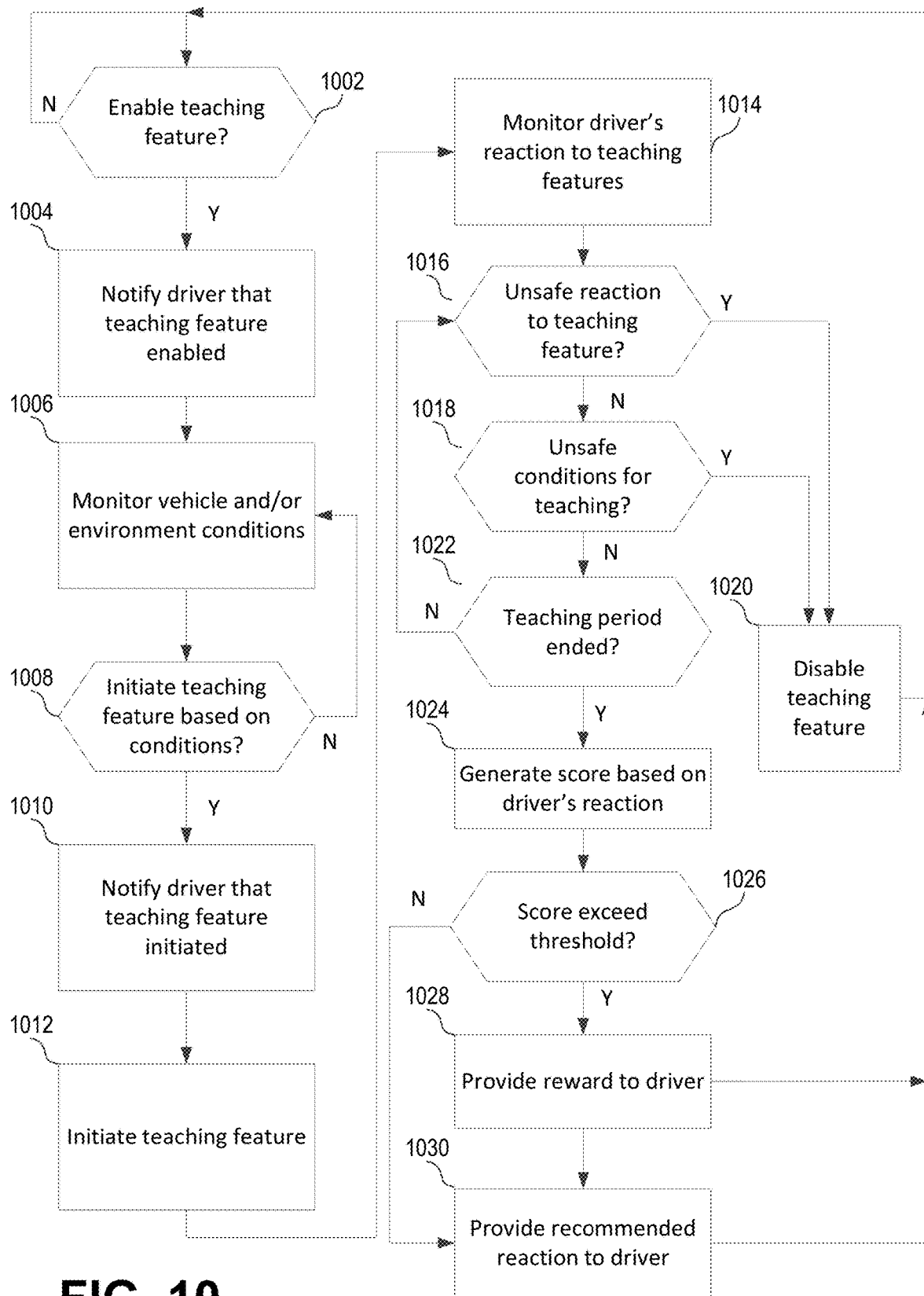
FIG. 10 is a flow diagram illustrating an example method of enabling vehicle teaching features and/or monitoring the driver's response to teaching features according to one or more aspects of the disclosure.

FIG. 10 is a flow diagram illustrating an example method of enabling vehicle teaching features and/or monitoring the driver's response to teaching features according to one or more aspects of the disclosure. The steps illustrated in FIG. 10 may be performed by one or more computing device 101. For example, a vehicle computing device (e.g., driving analysis computer 214 or vehicle control computer 217) and/or a driving analysis computing device (e.g., driving analysis computer 251) may perform one or more of the steps illustrated in FIG. 10. If a driver uses an autonomous vehicle, the driver may lose some of his or her driving skills over time. As will be described in further detail in the examples below, a vehicle may include a teaching feature that disables one or more autonomous driving features for a predetermined period of time. During this period of time, the driver may manually drive the vehicle, and the vehicle may provide instructions to the driver to teach and/or help the driver maintain his or her driving skills.

In step 1002, the computing device may determine whether to enable the teaching feature of the autonomous vehicle. The teaching feature may be enabled by the vehicle's computing device and/or the insurance provider's computing device. In some aspects, the driver may enable the teaching feature in step 1002 by providing an input to the vehicle's computing device. In step 1004, the vehicle's computing device notifies the driver that the teaching feature has been enabled, such as by providing feedback or confirmation to the driver that the teaching feature has been enabled. For example, the vehicle computing device may generate an audio, visual, and/or tactile prompt to the driver that the teaching feature has been enabled. In some aspects, a teaching feature light or icon on the car's graphical user interface may display an indication that the teaching feature is enabled. The teaching feature may also be disabled at any time, such as if the driver instructs the vehicle to disable the teaching feature.

In step 1006, the computing device may monitor current conditions of the vehicle or the vehicle's environment, and in step 1008, the computing device may determine whether to initiate the teaching feature based on current conditions (e.g., if a criterion is satisfied). If the computing device determines to initiate the teaching feature (step 1008: Y), the computing device in step 1010 may notify the driver of the vehicle that the teaching feature is or will be initiated. In step 1012, the teaching feature may be initiated, such as by switching off an autonomous vehicle feature. Non-limiting examples of steps 1006, 1008, 1010, and/or 1012 will now be provided.

In step 1006, the vehicle computing device may monitor the density of vehicles within a predetermined distance from the vehicle, as previously discussed with reference to FIG. 8. If the vehicle density drops below a threshold, the computing device may determine to initiate the teaching feature in step 1008, and notify the driver, in step 1010, that the teaching feature is or will be initiated. If the driver is notified in step 1010, the computing device may delay initiating the teaching feature for a predetermined amount of time, such as 5 seconds, to give the driver time to prepare. The driver may also be notified by visual, audio, and/or tactile information that the teaching feature will be initiated in 5 seconds. For example, the vehicle may display (or audibly speak) a countdown to initiation of the teaching feature. In step 1012, the computing device may initiate the teaching feature. For example, the computing device may switch off autonomous steering or autonomous speed control for a predetermined period of time (e.g., 10 minutes).

The vehicle's teaching feature may also be used to teach the driver how to react in particular conditions or environments. For example, the driver's merging skills may be kept up to date by switching off autonomous driving before the vehicle enters onto a ramp. The computing device may determine the vehicle's location and/or route, such as by tracking the driver's location using his or her mobile phone or any other location tracking mechanism. If the driver's current route will take the driver onto a ramp, the computing device may notify the driver that one or more autonomous driving feature will be switched off prior to the vehicle entering the ramp. The driver's ability to handle the vehicle in any other driving situation (e.g., switching lanes, bumper-to-bumper traffic, turning, etc.) may similarly be tested or refreshed by the computing device in a similar manner.

In step 1014, the computing device may monitor the driver's reaction (e.g., response) to the teaching feature. For example, the computing device may determine and/or store the driver's reaction to the autonomous steering or autonomous speed control being switched off. The computing device may determine the amount of time that the driver is below the speed limit and the amount of time that the driver is above the speed limit during the teaching period. The computing device may also track the number of times that the driver erroneously crosses a driving lane marking or divider (e.g., if the driver veers across a lane marker without intending to switch lanes or drives onto a shoulder of the road). If the driver is being taught how to merge, the computing device may determine, for example, the number of times that the driver brakes during his or her merge.

In step 1016, the computing device may determine whether the driver's reaction to the teaching feature is unsafe at any point during the teaching period. If the driver's reaction is unsafe (step 1016: Y), the computing device may disable the teaching feature by, for example, reactivating the automated driving feature in step 1020. The driver's reaction may be unsafe if the driver's reaction exceeds a threshold. For example, if the driver's speed exceeds the posted speed limit by a predetermined amount, such as 20 miles per hour over the speed limit, the computing device may reactivate autonomous speed control if it was deactivated for teaching. As another example, if the driver swerves into another lane or onto the shoulder by a predetermined distance, such as two feet, the computing device may reactivate autonomous steering if it was deactivated for teaching. As yet another example, if the driver brakes too hard (which may be measured by the amount of force applied to the brakes and/or the amount of deceleration of the vehicle), the computing device may reactivate autonomous driving if it was deactivated to refresh the driver's merging skills.

In step 1018, the computing device may determine whether the condition of the vehicle or the vehicle's environment is no longer safe for teaching (e.g., that the condition originally satisfied in step 1008 is no longer satisfied). If the environment is unsafe for teaching, the computing device may disable the teaching feature in step 1020. For example, the current conditions might not be safe for teaching if the vehicle density exceeds a predetermined threshold. The threshold may be the same as the threshold used to initiate the teaching feature in step 1008, or the thresholds may be different.

In step 1022, the computing device may determine whether the teaching period has ended. For example, the teaching period may last a predetermined amount of time after initiation of the teaching feature, such as 10 minutes. Alternatively, the teaching period may end when the driving action taught to the driver has ended, such as when the driver has successfully merged onto a highway. If the teaching period has not ended (step 1022: N), the computing device may continue to monitor for an unsafe response in step 1016 and/or unsafe conditions in step 1018.

If the teaching period has ended (step 1022: Y), the computing device, in step 1024, may generate a score based on the driver's reaction(s) during the teaching period. As previously discussed, the score may be based on one or more values and/or weights. For example, the score may be on a scale of 0 to 100, with 100 being the best or preferred response. The computing device may generate a score of 100 if the vehicle does not detect any mistakes during the teaching period. For example, the driver may receive a score of 100 if the vehicle does not exceed the speed limit (or a predetermined amount above the speed limit, such as 5 miles per hour above the speed limit) with the autonomous speed control switched off. Deductions may be made each time the driver exceeds the speed limit and/or based on a comparison of the amount of time that the driver spends above the speed limit and an amount of time that the driver spends at or below the speed limit. For example, if the teaching period is 10 minutes, and the vehicle spends 7 minutes at or below the speed limit, the computing device may generate a score of 70% (e.g., 7/10).

As another example, the driver may receive a score of 100 if the vehicle does not cross onto the shoulder of the road with autonomous steering switched off. Deductions may be made for each instance of the vehicle crossing onto the shoulder and/or based on a comparison of the amount of time the vehicle spends in driving lanes and the amount of time the vehicle spends at least partially in the shoulder lane. As yet another example, the driver may receive a score of 100 if the vehicle does not brake at all when the driver's merging skills are tested. Deductions may be made each time the driver applies the brakes.

In step 1026, the computing device may determine whether the score generated in step 1024 exceeds one or more score threshold. In some examples, the threshold may determine whether the driver's response was sufficient or not. In step 1028, the computing device may provide a reward to the driver if the driver's score exceeds the threshold (step 1026: Y). Exemplary rewards were previously described, and may include, for example, a reduction in an insurance premium, a gift, such as a free movie rental or free gas, or any other reward.

On the other hand, if the driver's score does not exceed the threshold (step 1026: N), the computing device, in step 1030, may provide one or more recommendations to the driver to help the driver improve or refresh his or her driving skills In some aspects, the recommendation may be given to the driver while the driver is still in the vehicle. For example, a voice prompt may recommend that the driver slow down next time if the driver spent too much time above the speed limit with autonomous speed control deactivated. Other recommendations may be provided based on which autonomous feature was deactivated. The recommendations may additionally or alternatively be provided to the driver visually, such as on a display of the vehicle (e.g., an LCD screen, a heads-up-display (HUD), and the like).

As previously discussed with reference to FIG. 9, the computing device may also determine an amount of a property of an insurance policy for the vehicle, such as an insurance premium amount, based on the score generated in step 1024.

A new insurance policy may be created for semi-autonomous or completely autonomous vehicles. In particular, traffic accidents may be less and less likely caused by the driver as vehicles utilize more and more autonomous features. As such, liability may be allocated amount multiple parties, including (1) the driver, (2) manufacturers (or servicers) of malfunctioning autonomous features (e.g., malfunctioning autonomous steering, braking, and/or speed control), (3) manufacturers (or servicers) of malfunctioning roadway infrastructure or malfunctioning V2I or I2V communication systems, and/or (4) third parties that illegally accesses (e.g., hack) the vehicle's autonomous driving system.

In some aspects, the driver may be primarily liable if the driver overrides the autonomous system or automated system warnings and causes an accident by initiating manual driving features. The driver might not be primarily liable in certain situations, such as if the teaching feature previously described is automatically enabled and initiated (e.g., without the driver's input). The manufacturer of an autonomous feature (e.g., autonomous steering) may be liable if the autonomous feature malfunctions and causes an accident. No-fault coverage may be used if an "Act of God," such as severe weather or other interference, confuses the sensors in the vehicle, causing an accident during autonomous driving mode.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:
1. A method comprising:
   determining whether a density of vehicles within a predetermined distance of a vehicle is below a threshold density of vehicles;
   in response to a determination that the density of vehicles within the predetermined distance of the vehicle is below the threshold density of vehicles, determining to switch off an autonomous feature of the vehicle;
   in response to the determining to switch off the autonomous feature of the vehicle, sending one or more of visual, audio, and/or tactile information indicating that the autonomous feature of the vehicle will be switched off after a predetermined time period;

after the predetermined time period, sending, by a computing device and to the vehicle, computer-executable instructions to switch off the autonomous feature of the vehicle;

determining, by the computing device, operational data of the vehicle after the autonomous feature of the vehicle is switched off, wherein the operational data of the vehicle indicates a response, of a driver of the vehicle, to the autonomous feature of the vehicle being switched off;

after the autonomous feature of the vehicle is switched off and within a predetermined teaching time period after the autonomous feature of the vehicle is switched off, determining that the response, of the driver of the vehicle, does not exceed a threshold response during the predetermined teaching time period;

after the predetermined teaching time period expires and based on the determining that the response, of the driver of the vehicle, does not exceed the threshold response during the predetermined teaching time period, maintaining the autonomous feature of the vehicle to be switched off and generating a score based on the operational data of the vehicle; and after the predetermined teaching time period expires, after the maintaining the autonomous feature of the vehicle to be switched off, and based on determining that the response, of the driver of the vehicle, exceeds the threshold response, reactivating the autonomous feature of the vehicle.

2. The method of claim 1, further comprising:
if the score exceeds a threshold score, providing a reward to the driver of the vehicle.

3. The method of claim 1, further comprising:
if the score does not exceed a threshold score, generating a recommended response for the driver of the vehicle.

4. The method of claim 3, further comprising:
providing the recommended response to the driver of the vehicle while the driver is in the vehicle.

5. The method of claim 1, further comprising:
prior to switching off the autonomous feature of the vehicle, determining that the driver of the vehicle has enabled a teaching feature of the vehicle.

6. The method of claim 1, further comprising:
in response to a determination that the density of vehicles within the predetermined distance of the vehicle is below the threshold density of vehicles at a first time but is not below the threshold density of vehicles at a second time after the first time, switching on the autonomous feature of the vehicle.

7. The method of claim 1, further comprising:
determining a value of a property of an insurance policy for the vehicle based on the generated score.

8. The method of claim 1, wherein the threshold response is based on one or more of a speed limit, deviation from a lane which the vehicle is intended to use, an amount of force applied to brakes of the vehicle, or an amount of deceleration of the vehicle.

9. A system comprising:
a vehicle configured to operate with an autonomous feature; and
a driving analysis computing device comprising:
a processor; and
memory storing computer-executable instructions that, when executed by the processor, cause the driving analysis computing device to:

determine whether a density of vehicles within a predetermined distance of the vehicle is below a threshold density of vehicles;

in response to a determination that the density of vehicles within the predetermined distance of the vehicle is below the threshold density of vehicles, determine to switch off an autonomous feature of the vehicle, in response to the determining to switch off the autonomous feature of the vehicle, send one or more of visual, audio, and/or tactile information indicating that the autonomous feature of the vehicle will be switched off after a predetermined time period;

after the predetermined time period, send a computer-executable instruction to the vehicle to switch off the autonomous feature of the vehicle; and determine operational data of the vehicle after the autonomous feature of the vehicle is switched off, wherein the operational data of the vehicle indicates a response, of a driver of the vehicle, to the autonomous feature of the vehicle being switched off; and after the autonomous feature of the vehicle is switched off and within a predetermined teaching time period after the autonomous feature of the vehicle is switched off, determine that the response, of the driver of the vehicle, does not exceed a threshold response during the predetermined teaching time period;

after the predetermined teaching time period expires and based on the determining that the response, of the driver of the vehicle, does not exceed the threshold response during the predetermined teaching time period, maintain the autonomous feature of the vehicle to be switched off and generate a score based on the operational data of the vehicle after the autonomous feature is switched off; and after the predetermined teaching time period expires, after the maintaining the autonomous feature of the vehicle to be switched off, and based on determining that the response, of the driver of the vehicle, exceeds the threshold response, reactivate the autonomous feature of the vehicle.

10. The system of claim 9, wherein the memory stores computer-executable instructions that, when executed by the processor, cause the driving analysis computing device to:
if the score exceeds a threshold score, provide a reward to the driver of the vehicle.

11. The system of claim 9, wherein the memory stores computer-executable instructions that, when executed by the processor, cause the driving analysis computing device to:
if the score does not exceed a threshold score, generate a recommended response for the driver of the vehicle.

12. The system of claim 9, wherein the threshold response is based on one or more of a speed limit, deviation from a lane which the vehicle is intended to use, an amount of force applied to brakes of the vehicle, or an amount of deceleration of the vehicle.

13. A non-transitory computer readable medium storing instructions that, when read by a computing device, cause the computing device to:
determine whether a density of vehicles within a predetermined distance of a vehicle is below a threshold density of vehicles;

in response to a determination that the density of vehicles within the predetermined distance of the vehicle is below the threshold density of vehicles, determine to switch off an autonomous feature of the vehicle;

in response to the determining to switch off the autonomous feature of the vehicle, send one or more of visual, audio, and/or tactile information indicating that the autonomous feature of the vehicle will be switched off after a predetermined time period;

after the predetermined time period, send a computer-executable instruction to the vehicle to switch off the autonomous feature of the vehicle;

determine operational data of the vehicle after the autonomous feature of the vehicle is switched off, wherein the operational data of the vehicle indicates a response, of a driver of the vehicle, to the autonomous feature of the vehicle being switched off;

after the autonomous feature of the vehicle is switched off and within a predetermined teaching time period after the autonomous feature of the vehicle is switched off, determine that the response, of the driver of the vehicle, does not exceed a threshold response during the predetermined teaching time period;

after the predetermined teaching time period expires and based on the determining that the response, of the driver of the vehicle, does not exceed the threshold response during the predetermined teaching time period, maintain the autonomous feature of the vehicle to be switched off and generate a score based on the operational data of the vehicle after the autonomous feature is switched off; and after the predetermined teaching time period expires, after the maintaining the autonomous feature of the vehicle to be switched off, and based on determining that the response, of the driver of the vehicle, exceeds the threshold response, reactivate the autonomous feature of the vehicle.

14. The non-transitory computer readable medium of claim 13, storing instructions that, when read by the computing device, further cause the computing device to:

if the score exceeds a threshold score, provide a reward to the driver of the vehicle.

15. The non-transitory computer readable medium of claim 13, storing instructions that, when read by the computing device, further cause the computing device to:

if the score does not exceed a threshold score, generate a recommended response for the driver of the vehicle.

16. The non-transitory computer readable medium of claim 15, storing instructions that, when read by the computing device, further cause the computing device to:

provide the recommended response to the driver of the vehicle while the driver is in the vehicle.

17. The non-transitory computer readable medium of claim 13, storing instructions that, when read by the computing device, further cause the computing device to:

prior to switching off the autonomous feature of the vehicle, generate a notification for the driver of the vehicle that the autonomous feature of the vehicle will be switched off.

18. The non-transitory computer readable medium of claim 13, wherein the non-transitory computer readable medium stores instructions that, when read by the computing device, further cause the computing device to:

in response to a determination that the density of vehicles within the predetermined distance is below the threshold density of vehicles at a first time but is not below the threshold density of vehicles at a second time after the first time, switch on the autonomous feature of the vehicle.

19. The non-transitory computer readable medium of claim 13, storing instructions that, when read by the computing device, further cause the computing device to:

determine a value of a property of an insurance policy for the vehicle based on the generated score.

20. The non-transitory computer readable medium of claim 13, wherein the threshold response is based on one or more of a speed limit, deviation from a lane which the vehicle is intended to use, an amount of force applied to brakes of the vehicle, or an amount of deceleration of the vehicle.

* * * * *